(12) United States Patent
Edwards et al.

(10) Patent No.: US 7,527,467 B2
(45) Date of Patent: May 5, 2009

(54) RETRACTABLE RAMP SYSTEM FOR A MOBILITY VEHICLE

(75) Inventors: Paul H. Edwards, Durango, CO (US); Ryan K. Malone, Farmington, NM (US); Charles E. Johnson, Farmington, NM (US)

(73) Assignee: The Braun Corporation, Winamac, IN (US)

( * ) Notice: Subject to any disclaimer, the term of this patent is extended or adjusted under 35 U.S.C. 154(b) by 0 days.

(21) Appl. No.: 10/753,202

(22) Filed: Jan. 7, 2004

(65) Prior Publication Data

US 2004/0146385 A1 Jul. 29, 2004

Related U.S. Application Data

(60) Provisional application No. 60/443,483, filed on Jan. 29, 2003.

(51) Int. Cl.
*B60P 1/43* (2006.01)
(52) U.S. Cl. .................................. 414/537; 414/921
(58) Field of Classification Search .............. 414/537, 414/921; 192/37, 43.2
See application file for complete search history.

(56) References Cited

U.S. PATENT DOCUMENTS

| | | | | |
|---|---|---|---|---|
| 1,024,580 | A * | 4/1912 | Hunter | 192/37 |
| 3,983,584 | A * | 10/1976 | Holecek | 5/87.1 |
| 4,966,516 | A | 10/1990 | Vartanian | |
| 5,160,236 | A * | 11/1992 | Redding et al. | 414/537 |
| 5,257,894 | A * | 11/1993 | Grant | 414/537 |
| 5,305,486 | A * | 4/1994 | Smith et al. | 14/69.5 |
| 5,380,144 | A | 1/1995 | Smith et al. | |
| 5,391,041 | A | 2/1995 | Stanbury et al. | |
| 5,393,192 | A * | 2/1995 | Hall et al. | 414/537 |
| 5,636,399 | A * | 6/1997 | Tremblay et al. | 14/71.1 |
| 5,676,515 | A * | 10/1997 | Haustein | 414/537 |
| 5,775,232 | A * | 7/1998 | Golemis et al. | 105/458 |
| 5,832,555 | A * | 11/1998 | Saucier et al. | 14/71.1 |
| 5,871,329 | A | 2/1999 | Tidrick et al. | |
| 6,010,298 | A * | 1/2000 | Cohn et al. | 414/537 |
| 6,095,747 | A * | 8/2000 | Cohn | 414/546 |
| 6,186,733 | B1 * | 2/2001 | Lewis et al. | 414/537 |

(Continued)

OTHER PUBLICATIONS

International Search Report, PCT/US05/37378, mailed Apr. 24, 2006.

(Continued)

*Primary Examiner*—James Keenan
(74) *Attorney, Agent, or Firm*—Michael Best & Friedrich, LLP

(57) ABSTRACT

A retractable ramp system for a mobility vehicle. A ramp platform is driven by a reversible motor, associated drive pulley, and drive belt affixed to a ramp carriage assembly. A spring-loaded mechanical release assembly is used to engage the drive pulley to the motor and to disengage the drive pulley from the motor. A manual control assembly is used for manual deployment of the ramp when the drive pulley is disengaged from the motor. The ramp flap provides a transition between the ramp platform and a mobility vehicle. The ramp flap is supported by wheels which translate along the ramp platform. Linear bearing blocks attach to pivot arms of the carriage assembly, which are in turn pivotably attached to the ramp platfom. Linear bearing blocks translate the ramp platform along guide shafts during deployment and stowage.

8 Claims, 16 Drawing Sheets

U.S. PATENT DOCUMENTS

| | | | |
|---|---|---|---|
| 6,203,265 B1* | 3/2001 | Cohn et al. | 414/537 |
| 6,210,098 B1* | 4/2001 | Cohn et al. | 414/537 |
| 6,238,168 B1* | 5/2001 | Cohn et al. | 414/537 |
| 6,343,908 B1* | 2/2002 | Oudsten et al. | 414/537 |
| 6,409,458 B1* | 6/2002 | Cohn et al. | 414/537 |
| 6,470,523 B1 | 10/2002 | Sardonico | |
| 6,484,344 B1* | 11/2002 | Cooper | 14/71.1 |
| 6,602,041 B2* | 8/2003 | Lewis et al. | 414/537 |
| 6,843,635 B2* | 1/2005 | Cohn | 414/549 |
| 7,052,227 B2* | 5/2006 | Navarro | 414/537 |
| 7,264,433 B2* | 9/2007 | Navarro | 414/537 |
| 2001/0005478 A1* | 6/2001 | Lewis et al. | 414/537 |
| 2001/0008606 A1* | 7/2001 | Lewis et al. | 414/537 |
| 2001/0043853 A1* | 11/2001 | Lewis et al. | 414/537 |
| 2002/0081184 A1 | 6/2002 | Sternberg | |
| 2003/0007853 A1* | 1/2003 | Cohn et al. | 414/537 |
| 2004/0136820 A1* | 7/2004 | Cohn | 414/537 |
| 2006/0245883 A1* | 11/2006 | Fontaine et al. | 414/537 |

OTHER PUBLICATIONS

Written Opinion of the International Searching Authority, PCT/US05/37378, mailed Apr. 24, 2006.

* cited by examiner

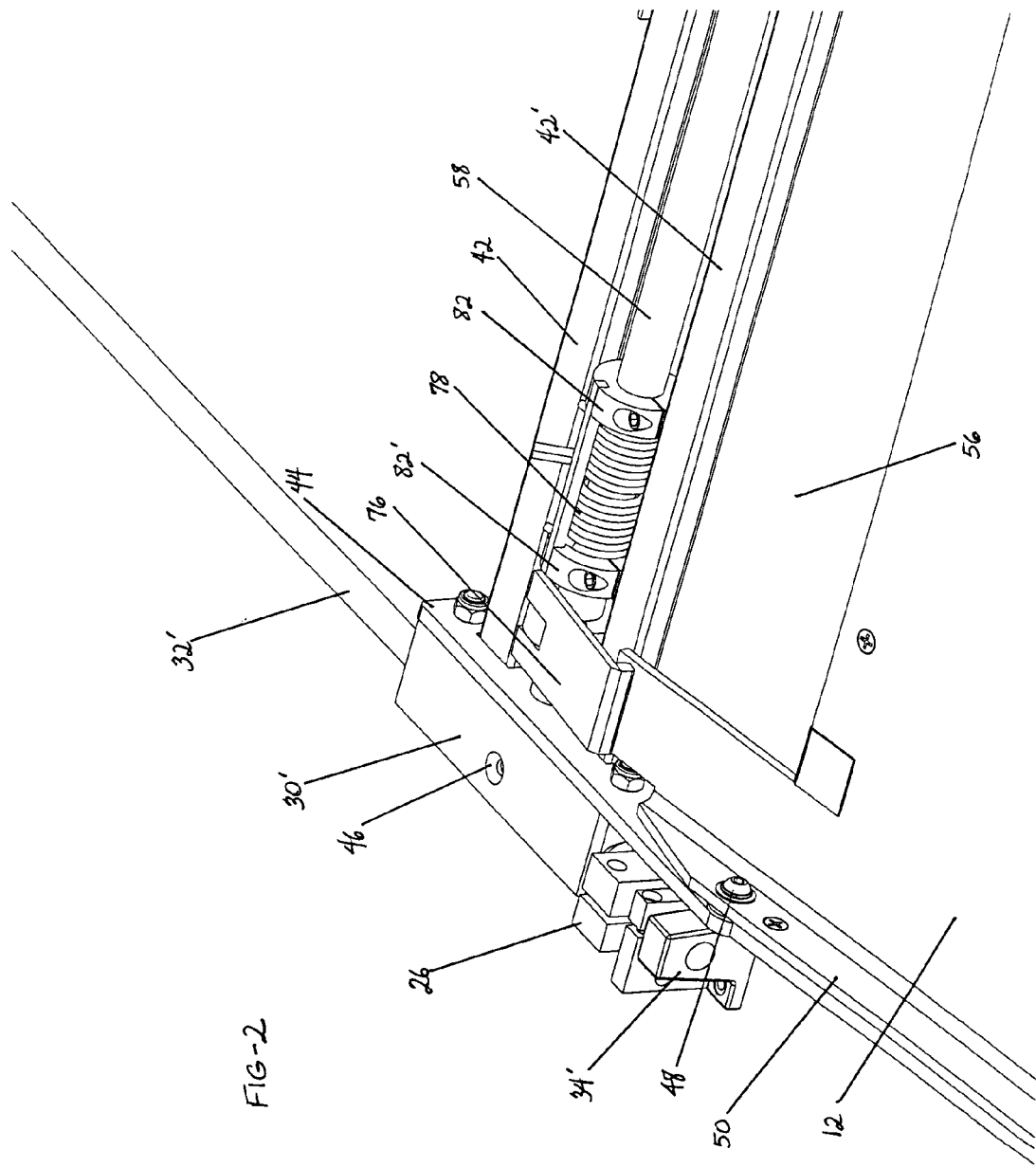

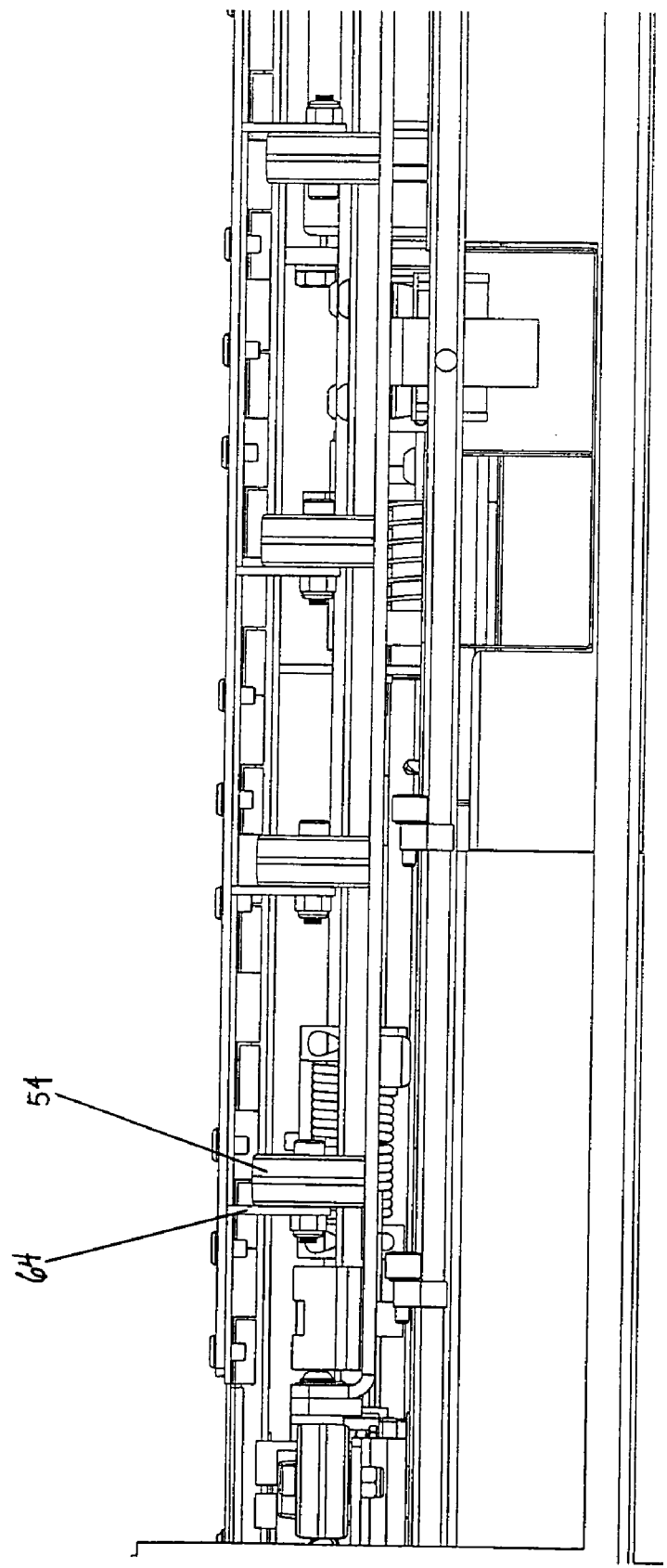

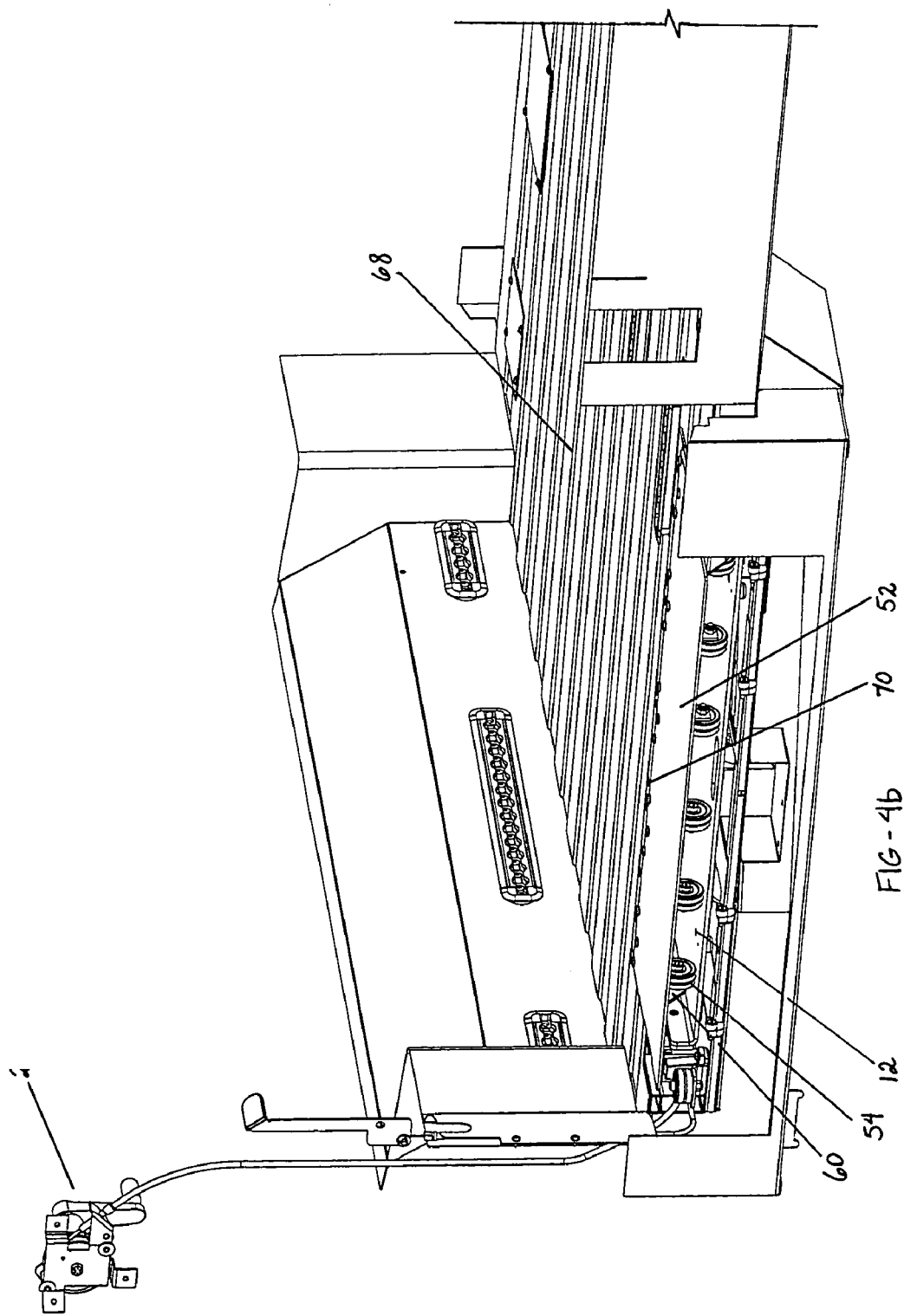

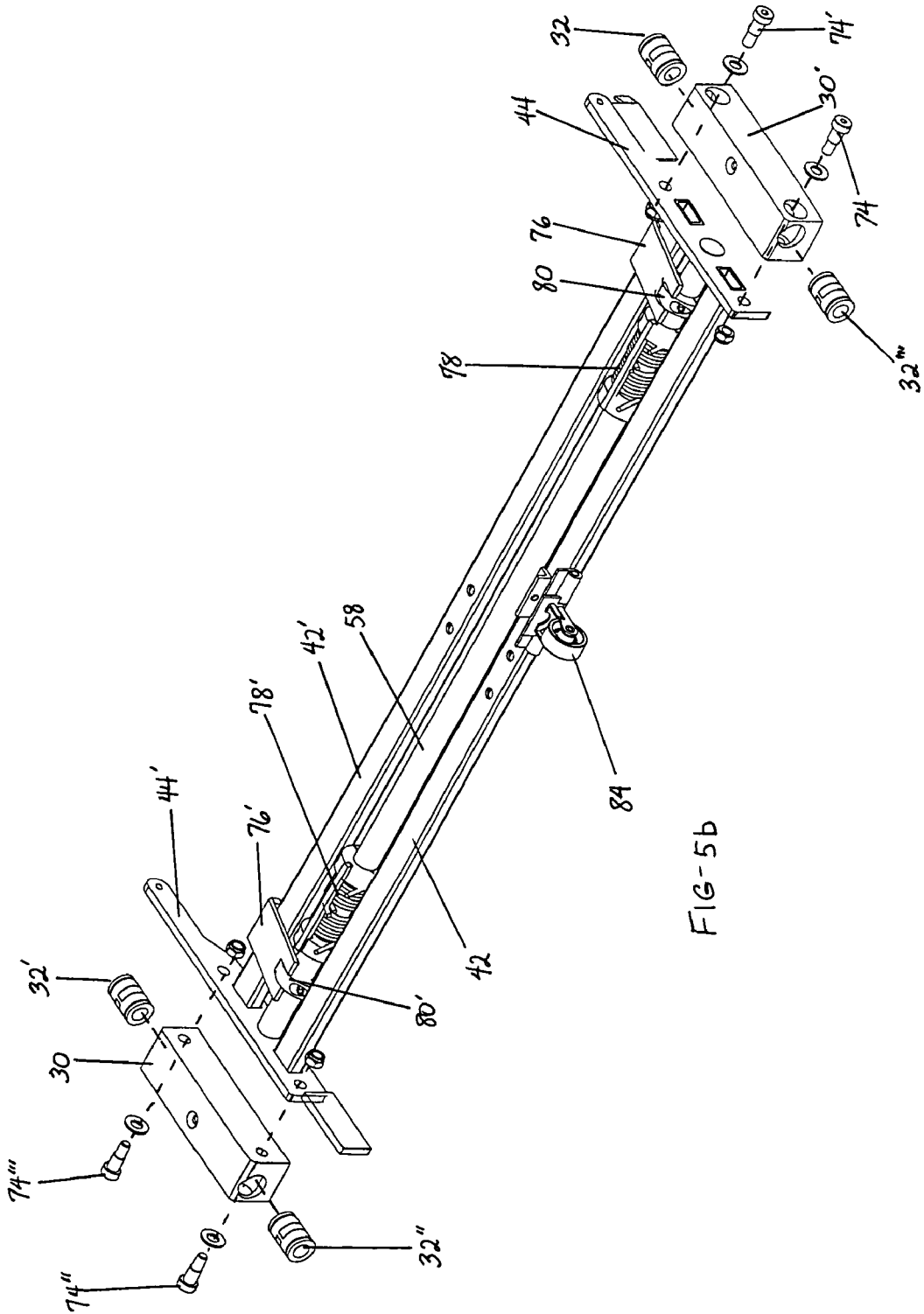

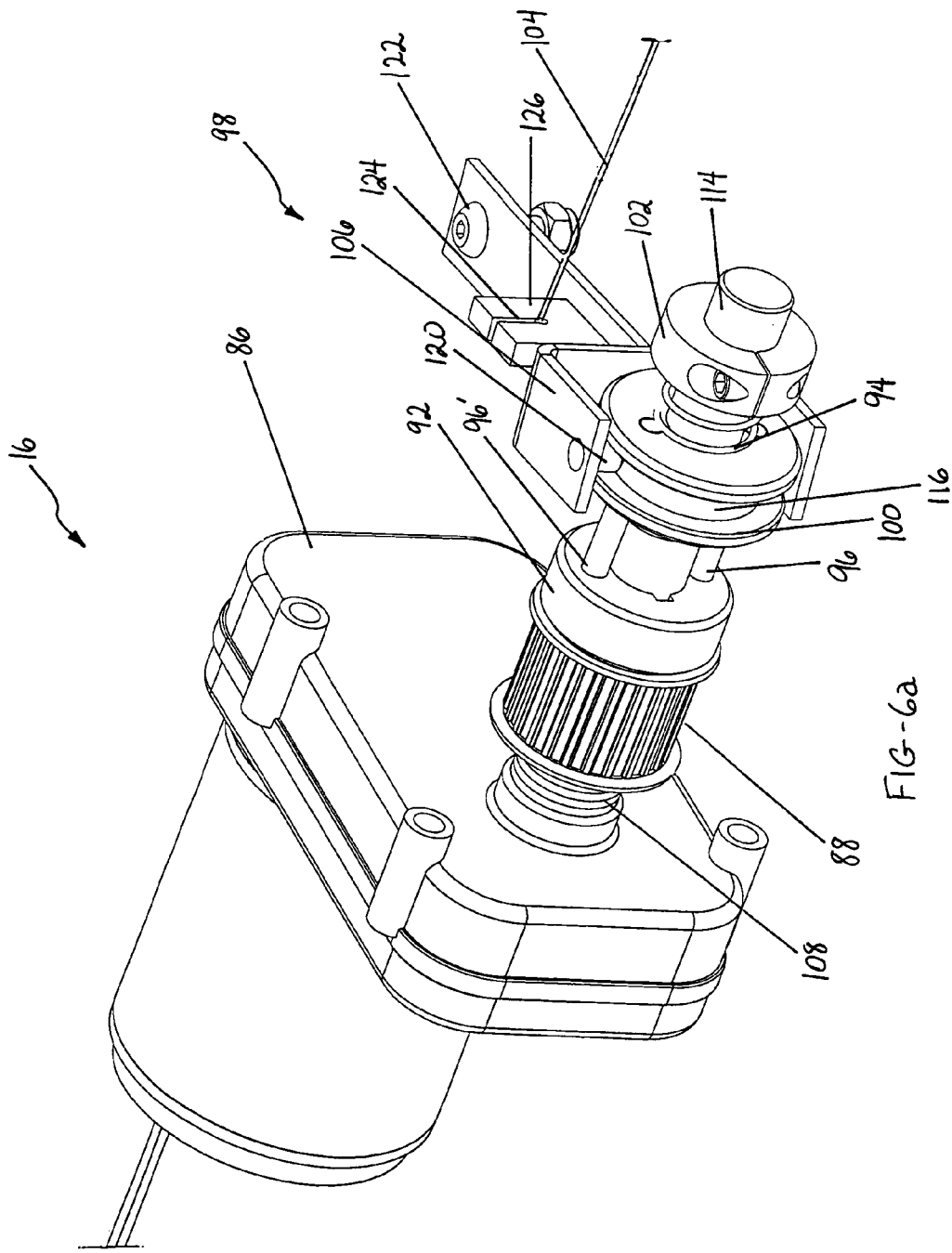

RETRACTABLE RAMP SYSTEM FOR A MOBILITY VEHICLE

CROSS REFERENCE TO RELATED APPLICATIONS

This application is based on U.S. Provisional Application Serial No. 60/443,483 entitled "Low Profile, Slide-Out Ramp Mechanism", filed on Jan. 29, 2003, the teachings of which are incorporated herein by reference.

BACKGROUND OF THE INVENTION

1. Field of the Invention (Technical Field)

The present invention relates generally to the field of ramps for facilitating disabled individuals ascent to and descent from a structure, particularly, the present invention relates to the field of retractable ramps used in motorized vehicles for efficient ingress and egress by wheelchair or scooter occupants.

2. Background Art

Vehicles adapted for mobility-challenged individuals are necessary to provide such individuals the ability to travel in a manner similar to ambulatory passengers. Historically, these vehicles consisted of full-sized vans having an electrical or hydraulic powered wheelchair lift installed on the vehicle to assist wheelchair occupants into and out of the van. These lifts consisted of a horizontal platform that translates vertically to allow the wheelchair or scooter occupant easy access from ground level to the interior of the vehicle for transport.

Recent mobility vehicles are often smaller vans, or "minivans", having a lowered floor. In these minivans, a section of the floor extending from the firewall to immediately in front of the rear wheel-well is modified such that it is lowered by a predetermined distance from the floor position of the manufacturer. These types of mobility vehicles provide the additional headroom required for a wheelchair occupant to access the interior of the vehicle while remaining seated in the wheelchair.

Some form of ramp allows the wheelchair occupant to be transported from the ground external to the vehicle to the floor within the modified vehicle. The ramp is typically stored in a vertical position in the sliding door entrance that is common to minivans and in the plane of the minivan sidewall. To access the ramp, the ramp is rotated outwardly about a pivot consisting of the lower end of the ramp located approximately at the floor of the van, until the opposite end of the ramp comes into contact with the ground. Examples of this type of ramp mechanism are described in U.S. Pat. No. 4,966,516 to Vartanian entitled, "Vehicle Access Ramp Having Alternative Pivots For Stowing," and U.S. Pat. No. 5,391,041 to Stanbury et al. entitled, "Hydraulically Operated Bus Ramp Mechanism."

While these types of ramps are generally reliable in function and provide the necessary access to the mobility vehicle, they block the vehicle entrance when stowed. These ramps also occupy valuable space in the interior of the vehicle and are not aesthetically pleasing.

Attempts have been made to address these issues, such as by positioning the ramp horizontally below the floor of the vehicle and configuring the ramp such that it slides horizontally outward from the stowed position. Once the ramp is fully extended from the stowed position, the far end is lowered to come into contact with the ground. However, this type of ramp also suffers from disadvantages. When the floor of a minivan is lowered, the ground clearance of the vehicle is decreased. Therefore, when installing any type of horizontally mounted ramp, a low profile must be retained to optimize the ground clearance of the vehicle.

Attempts to address the issue of the low profile required with horizontally mounted ramps have met with limited success. One example is described in U.S. Pat. No. 5,636,399 to Tremblay et al., entitled "Movable Ramp Assembly." The Tremblay patent utilizes a chain drive and side rails having a profile along which cams are driven to move the ramp platform. Wheels or bearings roll along the upper surface of the lip of the ramp platform and allow a flap to come down into position due to a chamfer in the lip of the ramp. This design is inferior in that it does not provide sufficient strength in the center of the ramp flap to allow an ambulatory person to step on the flap in the center of the flap when the ramp is in its stowed position. Further, the cam, or guide wheel profile used to move the ramp requires additional vertical space that reduces the ground clearance beneath the vehicle.

U.S. Pat. No. 5,393,192 to Hall et al. entitled, "Underfloor Extendible Ramp For Vehicles" uses two, toothed drive belts to power a ramp that can be extended from beneath a vehicle floor. The belts are driven from an auxiliary drive shaft that is in turn driven by another drive belt from the motor. One of the limitations of this ramp is that it requires the use of two separate motors; one to drive the ramp mechanism back and forth and a second to rotate the ramp up to floor level.

Another important consideration in slide-out ramp mechanisms is the inclusion of a ramp platform extension, or lip, along the side of sufficient height to prevent a wheelchair occupant from rolling off the ramp while traversing it. To provide adequate ground clearance the height of such a lip is constrained by the amount of storage space available for stowing the ramp when not in use. One example of a patent that includes a side lip on a ramp is U.S. Pat. No. 6,264,416 to Eaton, Jr., entitled "Compact, Slide-Out Ramp for a Minivan." The Eaton patent describes a drive mechanism mounted below the ramp platform. However, the space occupied by the drive mechanism has the undesirable result of requiring a diminutive ramp side lip in order to maintain a height profile marginally sufficient for ground clearance.

One deficiency of many prior art ramp mechanisms is the lack of a manual release to be used when power is lost to the ramp. A mobility-challenged individual cannot exit a vehicle in an emergency as quickly and easily as an ambulatory occupant making manual control of the ramp crucial. Prior art ramps do not allow quick and easy manual deployment. Most require the use of tools, or the actuation of a lever that can only be accessed from the outside of the vehicle, resulting in arduous and impractical deployment. Such a ramp is described in U.S. Pat. No. 5,636,399 Tremblay et al., supra. The user generally has to remove an access plate covering the drive mechanism and insert a tool, such as a lug wrench onto the end of the drive mechanism, which is usually some type of acme screw. The user then must manually turn the wrench multiple times, typically for several minutes, to deploy the ramp. This is extremely difficult for a person in a wheelchair, particularly when the drive mechanism is mounted below floor level.

Further, if the ramp drive mechanism cannot be released from the motor, the wheelchair occupant must back-drive the system against the resistance of the motor for manual deployment. This type of design is described in U.S. Pat. No. 5,676,515 to Haustein, entitled, "Low Floor Vehicle Ramp." Another difficulty with prior art ramps is the inability of the ramp to be deployed onto a curb. Many prior art ramps tend to drop down at the far end as they come to the end of their travel upon horizontal deployment from the force of gravity and lack of support at the far end. This often results in the ramp abutting the curb at a point lower than the top surface of the curb such that the ramp is not fully deployed and is unusable.

Still another difficulty with prior art ramps is the manner in which the ramp is transitioned to the vehicle floor. Many ramps rely upon a type of tilting mechanism such as in U.S. Pat. No. 6,238,168 to Cohn et al. entitled, "Ramp Assembly with Locking Mechanisms," or upon a type of transition flap, a relatively horizontal planar component extending between the near end of the ramp and the floor of the vehicle. Prior designs often provide substandard strength and stability for stepping onto the flap when the ramp is stowed.

Yet another problem with prior art ramps is the method by which the ramp translates back and forth from the stowed to the deployed position. Many ramps use some form of radial ball bearing for translation such as in U.S. Pat. No. 6,264,416, supra, and U.S. Pat. No. 5,380,144 to Smith et al. entitled, "Deployable Vehicle Access Ramp." The Smith patent uses roller ball bearings and a track mechanism to move back and forth. Still other designs use a low friction bearing material having two flat components that slide against one another, as described in U.S. Pat. No. 6,238,168, supra.

SUMMARY OF THE INVENTION (DISCLOSURE OF THE INVENTION)

An improved method for transitioning the ramp from the stowed to the deployed position is needed that would allow the ramp to slide freely to facilitate manual release and control when needed. Ideally, such a ramp would occupy a low profile, maintain a horizontal position upon deployment, have a simple mechanical release of the ramp from the motor, ha a reversible motor, have a well-supported ramp flap, and be cost-effective to manufacture.

A retractable ramp system is provided that includes a ramp platform, ramp carriage assembly for moving the ramp platform between the stowed and deployed positions, a reversible motor and drive shaft, a drive pulley mounted on the motor drive shaft, a drive belt in direct communication with the drive pulley and ramp carriage assembly, and a mechanical motor release assembly. The mechanical motor release assembly includes a release cable and a release actuator in communication with an end of the release cable. The release actuator engages and disengages the drive pulley from the motor.

The release actuator operates in conjunction with a sliding collar mounted upon the motor drive shaft, the sliding collar being engaged with an end of the release actuator by pins affixed to an end of the release actuator. The sliding collar has at least one pin extending from the collar along the drive shaft for engaging the drive pulley. A first end of the release actuator pivots about a pivot point and the opposite end engages the sliding collar. A keyed collar is mounted on the drive shaft between the sliding collar and drive pulley. The keyed collar defines at least one opening through which pins of the sliding collar pass. The drive pulley also defines at least one opening through which pins of the sliding collar are insertable. When the pins of the sliding collar are inserted into the mating openings of the drive pulley, the drive pulley is engaged with the motor. When the pins of the sliding collar are removed from the mating openings in the drive pulley, the drive pulley is disengaged from the motor.

The sliding collar is spring-loaded by a spring mounted upon the drive shaft between a stop collar and the sliding collar. The spring force opposes that of the release cable which pulls upon the release actuator and disengages the pins from the drive pulley.

The retractable ramp system further includes a manual control assembly for manual deployment of the ramp when the motor is disengaged from the drive pulley. The manual control assembly includes a manual control bearing block that is in communication with the ramp carriage assembly, a manual control cable in communication with the manual control bearing block, and a crank in communication with the manual control cable. The crank includes a crank handle and a manual control pulley that is in communication with the crank handle and manual control cable. A first end of a shaft is inserted into the crank handle, and a second end of the shaft receives a one-way bearing and is in communication with the manual control pulley.

The ramp carriage assembly of the retractable ramp system translates the ramp between the stowed and deployed positions with linear bearings translational along guide shafts. Pivot arms are attached to the linear bearings and are pivotably attached to the ramp platform. The carriage assembly also includes a member extending orthogonally between the pivot arms, and a torsion bar extending orthogonally between the pivot arms. A torsion spring preloads the torsion bar.

Flapper bars extend between the torsion bar and an end of the ramp platform. The flapper bars provide a downward force against the near end of the ramp platform to counteract the gravitational force upon the ramp platform when the far end pivots down upon deployment.

The retractable ramp system also includes a ramp flap that is attached to a hinge that is affixed to the mobility vehicle floor. Several ramp flap wheels are affixed to an underside of the ramp flap. These wheels translate along the ramp platform during deployment and stowage. Ramp flap actuator brackets affixed to the outermost ramp flap wheels provide a force against the underside of the ramp flap upon movement of the ramp platform toward stowage.

There is a cutout portion in the ramp platform through which the ramp flap wheels drop upon deployment of the ramp platform, allowing the ramp flat to sit flush against the ramp platform for a smooth transition between the ramp platform and mobility vehicle.

The ramp platform also includes a side lip of a height approximately equal to the height of the ramp flap wheels. The profile of the carriage assembly is approximately equal to the profile of the ramp platform.

The present invention is also a method of operating a retractable ramp system. The method includes the steps of providing a ramp platform; moving the ramp platform with a ramp carriage assembly; powering the ramp platform with a motor having a motor drive shaft; providing a drive pulley upon the motor drive shaft; moving the ramp carriage assembly with a belt in direct communication with the drive pulley and ramp carriage assembly; and mechanically disengaging and engaging the drive pulley from the motor with a mechanical motor release assembly.

The step of mechanically disengaging and engaging the drive pulley from the motor with a mechanical motor release assembly includes disengaging the motor from the drive pulley with a release actuator. A cable is used to pull the release actuator causing the release actuator to pivot about a pivot point. The method further includes translating a sliding collar along the motor drive shaft with the end of the release actuator opposite the pivot point. The method additionally includes providing at least one pin extending from the sliding collar for engaging with and disengaging from the drive pulley, and providing a keyed collar mounted upon the motor drive shaft between the sliding collar and drive pulley. Pins of the sliding collar pass through mating openings defined in the keyed collar. Removing pins of the sliding collar from mating openings defined in the drive pulley disengages the drive pulley from the motor. This occurs when the release cable is used to pull and pivot the release actuator which in turn translates the sliding collar away from the drive pulley along the drive shaft.

The method also includes spring-loading the sliding collar with a spring force opposing the pulling force applied to the release actuator by the release cable. Inserting the pins of the sliding collar into the mating openings defined in the drive pulley with the spring force exerted on the sliding collar engages the drive pulley with the motor.

The method of operating a retractable ramp system further includes manually controlling the ramp system when the drive pulley is disengaged from the motor. Manually controlling the ramp system includes providing a manual control bearing block in communication with the ramp carriage assembly; and translating the ramp carriage assembly with the manual control bearing block by moving the manual control bearing block with a manual control cable.

Moving the manual control bearing block with a manual control cable includes turning a crank handle, and taking up the manual control cable onto a manual control pulley controlled by the crank handle. The method also includes allowing the manual control pulley to rotate only in a single direction.

The step of moving the ramp platform with a ramp carriage assembly includes providing pivot arms pivotably attached to the ramp platform; providing linear bearings attached to the pivot arms; and translating the linear bearings along guide shafts. This step also includes providing a member extending orthogonally between the pivot arms, and providing a torsion bar extending orthogonally between the pivot arms. The step further includes preloading the torsion bar with a torsion spring.

The method of operating a retractable ramp system additionally includes providing a downward force against an end of the ramp platform with a flapper bar extending between the torsion bar and an end of the ramp platform.

The method of operating a retractable ramp system includes providing a ramp flap, rotating the ramp flap with a ramp flap hinge, providing at least one ramp flap wheel affixed to an underside of the ramp flap, and translating a ramp flap wheel upon the ramp platform. Additionally, the method consists of providing a force against the ramp flap upon a movement of the ramp platform with a ramp flap actuator bracket affixed to one of the ramp flap wheels. The method also consists of dropping a ramp flap wheel into a cutout defined in the ramp platform upon deployment of the ramp platform.

The present invention is further a method of deploying a retractable ramp system. The method consists of rotating a motor shaft, rotating a drive pulley with the motor shaft, moving a drive belt with the drive pulley, deploying a ramp carriage assembly for a ramp platform with the drive belt, pivoting the ramp platform on support bearings of the ramp carriage assembly after the ramp platform is deployed beyond a predetermined point, and dropping wheels of a ramp flap into a cutout defined in the ramp platform upon deployment of the ramp platform.

The present invention is still further a method of stowing a retractable ramp system. The method includes rotating a motor shaft, rotating a drive pulley with the motor shaft, moving a drive belt with the drive pulley, stowing a ramp carriage assembly for a ramp platform with the drive belt, pivoting the ramp platform on support bearings of the ramp carriage assembly, rotating a ramp flap into a horizontal position with a force provided by brackets affixed to wheels affixed to an underside of the ramp flap, and translating the ramp flap wheels along the ramp platform.

A primary object of the present invention is to provide a low profile retractable ramp system. Another primary object of the present invention is to provide improved safety, by incorporating a higher side lip on the ramp platform, and to employ efficient and convenient means for manual release and control of the ramp system. Another primary object of the present invention is to provide a mechanical release for disengaging the drive pulley from the motor, for efficient manual control of the ramp system. Still another primary object of the present invention is to provide a convenient manual control means for manual deployment of the ramp. Yet another primary object of the present invention is to employ mechanical components for improved reliability and reduced cost.

A primary advantage of the present invention is the ability to manually disengage the ramp carriage assembly from the drive motor via a mechanical lever thereby allowing the ramp to translate freely. Another primary advantage of the present invention is the ability to readily translate the ramp manually in the event of an emergency loss of power by turning a conveniently located crank handle. Yet another primary advantage of the present invention is safety, due to the ease and speed at which the ramp can be manually deployed and due to having a higher ramp platform side lip which prevents a wheelchair from rolling off of the ramp. Still another primary advantage of the present invention is its low-profile which limits intrusion into the passenger compartment of the mobility vehicle, allowing greater occupant space, greater ground clearance beneath the vehicle, and a higher ramp side lip. Still yet another primary advantage of the present invention is that it is not specific to any particular vehicle and is adaptable for a variety of vehicles or buildings. And still another primary advantage of the present invention is the ability to step or roll over the ramp flap when the ramp system is stowed without damage to the ramp flap. Another primary advantage of the present invention is the direct connection between the drive belt and motor, reducing the number of drive components and potential causes of failure. And yet another primary advantage of the present invention is the simple mechanical release mechanism for disengaging the motor, such that the drive belt tension need not be released or tightened at any time, eliminating the possibility of improper retensioning of the belt. A further primary advantage of the present invention is its low-cost, simplicity, and reliability, in particular due to the incorporation of simple mechanical components for manual release of the drive pulley from the motor and for manual control of the ramp once the motor is disengaged via the manual release.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate a preferred embodiment of the present invention and, together with the description, serve to explain the principles of the invention. The drawings are not to be construed as limiting the invention.

FIG. 2 is a closer perspective view of the near end of the ramp system of FIG. 1*a*, shown in a deployed position;

FIG. 3*b* is an end-view of the ramp platform of the present invention;

FIG. 4*b* is a perspective view of a mobility vehicle with the retractable ramp system of the present invention in a stowed position;

FIG. 5*b* is a perspective view of the carriage assembly of FIG. 5*a* with the torsion bar;

FIG. 6*a* is a perspective view of the motor and release assembly of the present invention with the motor disengaged from the carriage assembly by the release assembly;

DESCRIPTION OF THE PREFERRED EMBODIMENTS (BEST MODES FOR CARRYING OUT THE INVENTION)

The present invention is a system and method for deploying and stowing a low-profile ramp incorporated horizontally into the floor of a mobility vehicle to allow a smooth transition between the floor of the vehicle and the ground, or other external surface. The preferred embodiment of the present invention for a retractable ramp system includes a ramp platform, carriage assembly, ramp transition flap, motor and drive belt, mechanical motor release, and manual control capability. The construction of the invention is described first followed by the method of operation.

As used herein the term "mobility vehicle" refers to any vehicle used to transport disabled individuals, including but not limited to standard-sized vans, mini-vans, buses, trains, and the like. As used herein, the term "distal" refers to those points at a distance from the mobility vehicle, such as the end of the ramp that engages the ground. Conversely, the term "near" refers to points closer to the mobility vehicle.

Although ramp system 10 is depicted in the figures as being installed laterally across a mobility vehicle in order to align with typical door placement, it will be understood by those of skill in the art that the ramp system can be installed longitudinally in the vehicle in accordance with the teachings of the invention.

Figure 1A:
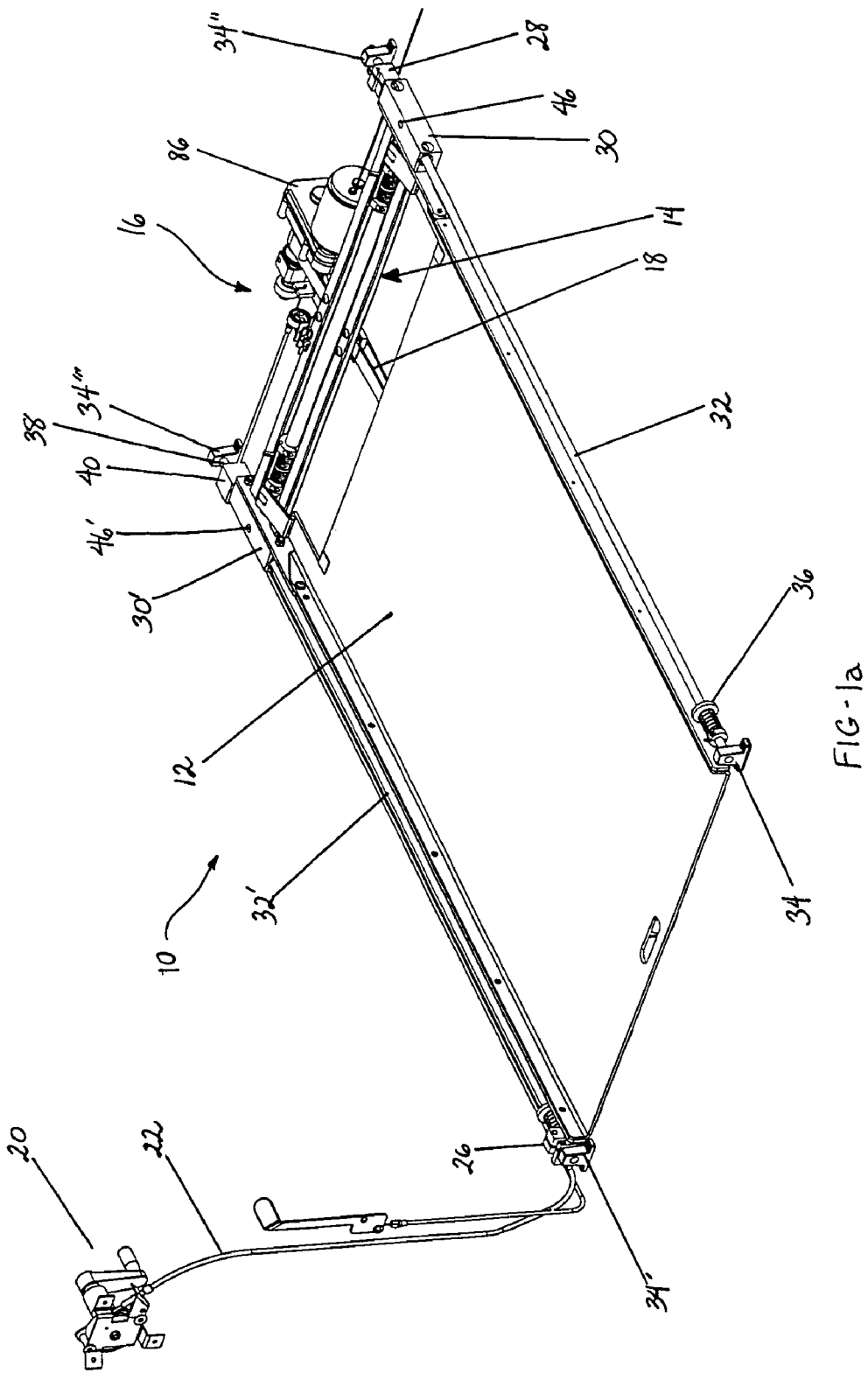
FIG. 1*a* is a perspective view of the preferred embodiment of the present invention for a retractable ramp system for a mobility vehicle shown with the ramp flap assembly removed.
Figure 1B:
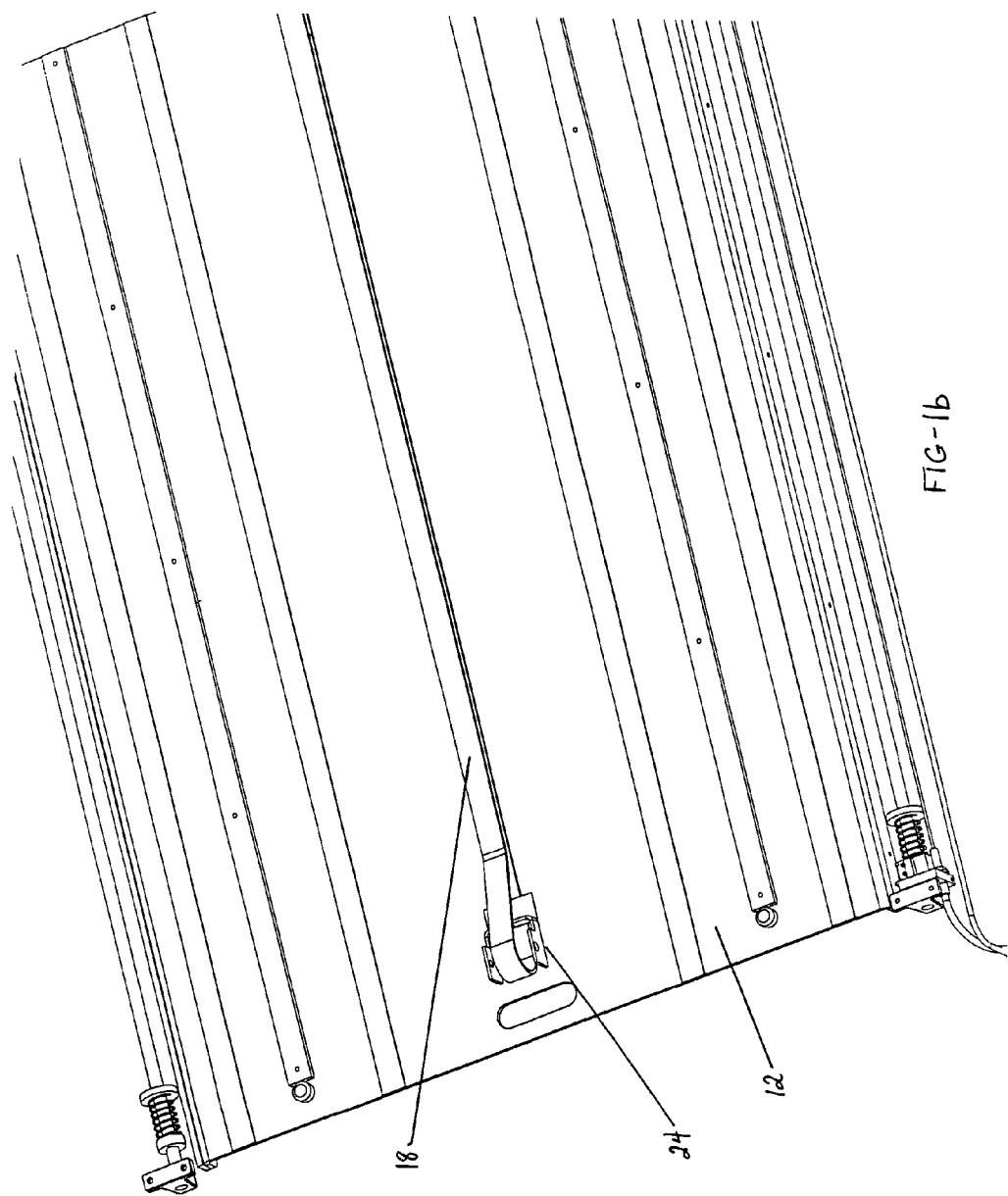
FIG. 1*b* is an underside view of the ramp platform of the present invention.

Referring to FIG. 1*a*, a perspective overall view of the present invention for a retractable ramp system 10 for a mobility vehicle is shown. The ramp flap 52 of the preferred embodiment is removed from FIG. 1*a* for ease of viewing the components at the near end of ramp system 10. A slide-out ramp platform 12 extends horizontally until reaching the end of its travel at which point ramp platform 12 pivots over a set of pivot bearings to allow the ramp to extend to the ground. The bearings are connected to the ramp enclosure. Carriage assembly 14 (FIGS. 5*a* and 5*b*) consisting of a sufficiently sturdy material, such as steel, provides a frame for ramp platform 12. Carriage assembly 14 glides back and forth laterally along the width of the mobility vehicle and is attached to ramp platform 12 and drive belt 18. FIG. 1*b* shows an underside view of ramp platform 12. Carriage assembly 14 allows for deployment and stowage of ramp platform 12. The profile of carriage assembly 14 is approximately equal to, being only slightly larger, than that of the ramp platform 12 thereby contributing to an overall low profile for the ramp system.

A pair of linear bearing blocks 30, 30' containing linear ball bearings which ride longitudinally along parallel, linear bearing guide shafts 32, 32' allows carriage 14 to travel in a smooth, linear motion from the stowed to the deployed positions as guided by shafts 32, 32'. Each bearing block 30, 30' is preferably formed from a sufficiently sturdy and durable material, such as some form of plastic or steel, having a sufficiently low coefficient of friction for sliding against the ramp platform enclosure, and contains one or more commercially available, linear ball-bearing assemblies configured to translate along the axis of shaft 32. Preferably two ball-bearing assemblies are enclosed in each block to provide a smoother motion and reduce the load on each bearing assembly. Bearing blocks 30, 30' function to enclose the linear ball-bearing assemblies, thus it will be understood by those of skill in the art that bearing blocks 30, 30' can take a variety of shapes and dimensions in order to accomplish this task.

The ball bearing assembly is lightly pressed into bearing block 30 and is prohibited from sliding out of position by a shoulder bolt (not shown) that acts as a stop if the linear ball bearing assembly were to slide out of position. The shoulder bolt also serves as a means of attaching bearing block 30 to pivot arm 44 of the carriage assembly. (See FIG. 5*b*.)

Shafts 32, 32' are of a sufficiently sturdy and rigid construction and are supported at opposing ends by standoffs 34, 34', 34", 34'". Each standoff 34 is fixedly attached to the ramp enclosure by bolts or other fastening means such as but not limited to welding.

A reversible electric motor and mechanical release assembly 16 is mounted to the mobility vehicle and in proximity to carriage 14. Drive belt 18 translates carriage 14 and ramp platform 12 between stowed and deployed positions. Drive belt 18 is attached to the center of carriage 14 and is driven by reversible electric motor 86. Motor 86 is preferably mounted to the underside of the floor of the mobility vehicle with drive belt 18 forming a loop around drive pulley 88 on one end and a tensioning pulley on the other end. The tension of drive belt 18 is adjustable by drive belt tension adjuster 24 (FIG. 1*b*). The drive belt tension adjuster 24 is connected to the enclosure, with connection means such as a bolt. The opposite end of drive belt tension adjuster 24 holds the tensioning pulley.

Crank assembly 20 is in communication with the manual control assembly via a cable located within cable guide sheath 22 for manual control of the ramp free from motor 86. During manual control, cable-driven manual control bearing block 40 allows carriage 14 to translate via the turning of a crank handle of crank assembly 20 that rotates a pulley which takes up the cable attached to manual control block 40.

Ramp deployed limit switch 26 is located within the ramp enclosure. Limit switch 26 disconnects power to motor 86 upon activation by ramp platform 12 when fully deployed. Limit switch 26 is triggered by touch of a small bracket connected to the ramp carriage that trips a roller lever switch. Ramp stowed limit switch 28 is located at the near end of ramp system 10. Ramp stow limit switch disconnects power to motor 86 upon activation by ramp platform 12 when in the fully stowed, or retracted, position. Limit switch 28 is triggered by touch of a small bracket connected to the ramp carriage that trips a roller lever switch. Stop collar 36 stops the near end of ramp platform 12 from deployment beyond the distal end of shafts 32, 32' when ramp system 10 is being deployed. The bracket for ramp deployed limit switch 26 serves as an additional stop on the opposite side. Stop collar, 38 similarly prevents ramp platform 12 from being retracted beyond stop collar 38 by abutting manual control block 40 which in turn abuts linear bearing block 30' when ramp system 10 is retracted to the stowed position. The bracket for ramp stowed limit switch 28 serves as an additional stop on the opposite side.

Referring to FIG. 2, a perspective view of a corner of the near-end of the ramp system 10 of FIG. 1a is shown in the deployed position for a closer view of the components at the near end of ramp platform 12. As shown in FIG. 2, carriage assembly 14 comprises a pair of parallel rectangular members 42, 42' of sufficient rigidity, such as steel tubing, connected between opposing ramp pivot arms 44, and torsion bar 58. Carriage assembly 14 is described in further detail with reference to FIGS. 5a and 5b. Linear bearing block 30' is shown at the distal end of guide shaft 32'. Opening 46' of bearing block 30' allows for lubrication to be input to bearing block 30'. Bearing block 30 has a similar opening 46, as shown in FIG. 1a.

Figure 3A:
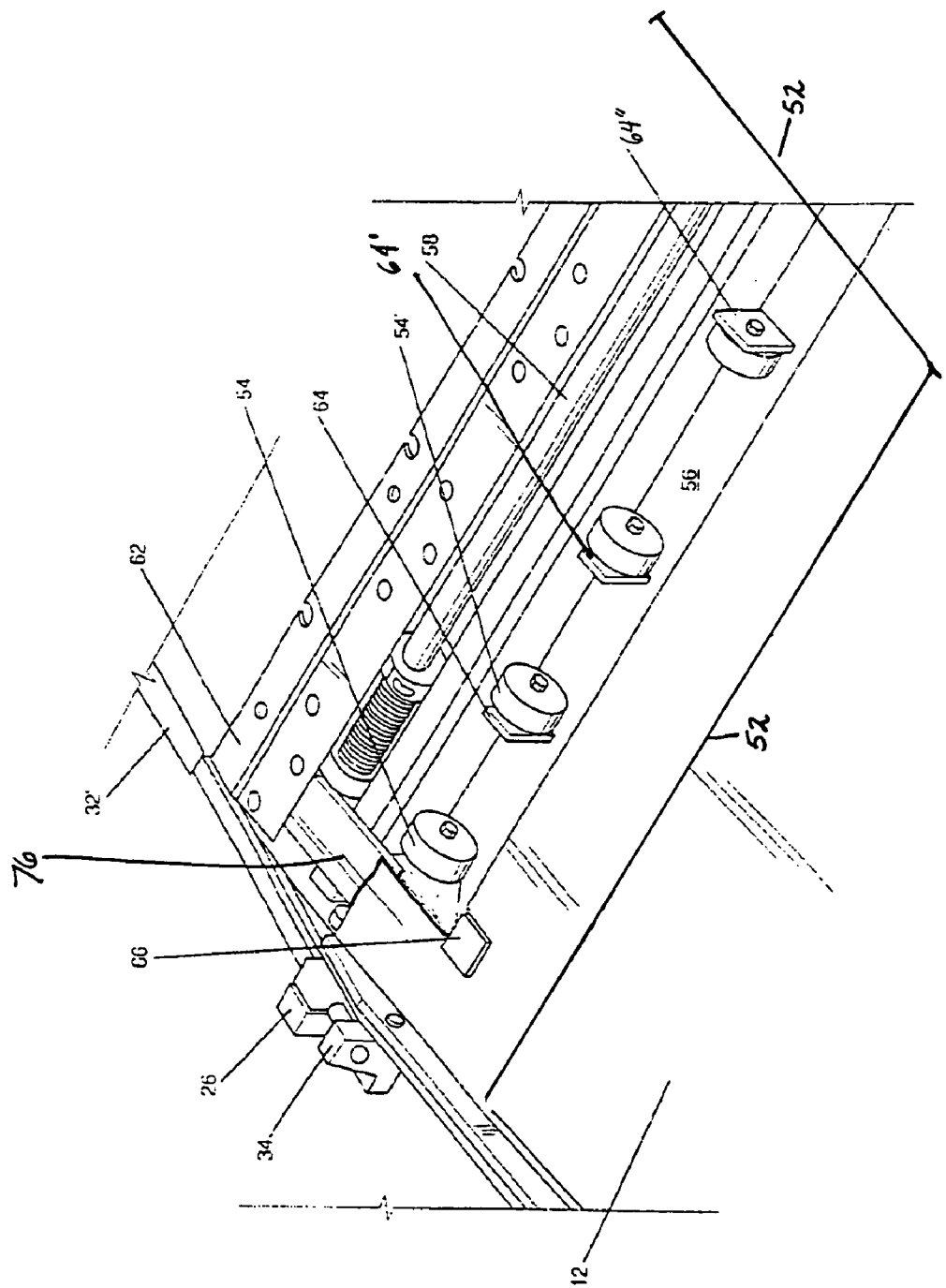
FIG. 3*a* is a perspective, cut-away view of the ramp flap assembly of the present invention.

Ramp platform 12 is connected by bolts, one of which is seen in FIG. 2, to carriage 14 allowing ramp platform 12 to pivot at the connection 48. A plurality of bearings allow platform 12 to pivot. Ramp platform 12 pivots downward from a horizontal position toward the ground or other external surface from the mobility vehicle when fully deployed. Ramp platform 12 includes a lip 50 along each edge that is substantially orthogonal to the plane of the ramp platform bottom surface. Preferably the height of lip 50 is sufficient to prohibit a wheelchair from inadvertently rolling from ramp platform 12. Attention is now directed to FIGS. 3a and 3b, where a perspective, cut-away view of ramp flap 52 that is located atop ramp platform 12, and an end-view of ramp platform 12, are shown respectively. Ramp flap 52 is removed from FIG. 3a to reveal the wheels and other components beneath. If flap 52 were shown, it would extend from the ramp platform 12 to the ramp flap hinge 62. A plurality of wheels 54 are attached to the underside of ramp flap 52 which roll along the upper, horizontally planar surface of ramp platform 12. Wheels 54 are supported by ramp platform 12 and in turn support ramp flap 52. Wheels 54 are positioned laterally in a row distally from rectangular carriage member 42'. Rectangular brackets 64 serve as the attachment points for the innermost wheels 54. Wedge-shaped, ramp flap actuator brackets 60 serve as the attachment points for the two outermost wheels 54. Brackets 60 and 64 are attached to the underside of ramp flap 52, preferably by welding.

Wheels 54 roll along ramp platform 12 when the ramp is in any position other than fully deployed. When ramp platform 12 reaches the fully deployed position, wheels 54 drop into cutout 56 defined in ramp platform 12. This causes ramp flap 52 to drop down so that the distal edge of ramp flap 52 contacts ramp platform 12 creating a smooth transition from ramp platform 12 to the floor of the mobility vehicle. (See also FIGS. 4a and 4b.)

Preferably, wheels 54 are of a rubber material enabling ramp platform 12 to slide more freely against ramp flap 52, however, wheels 54 can be formed from a variety of materials in accordance with the principles of the invention.

Figure 4A:
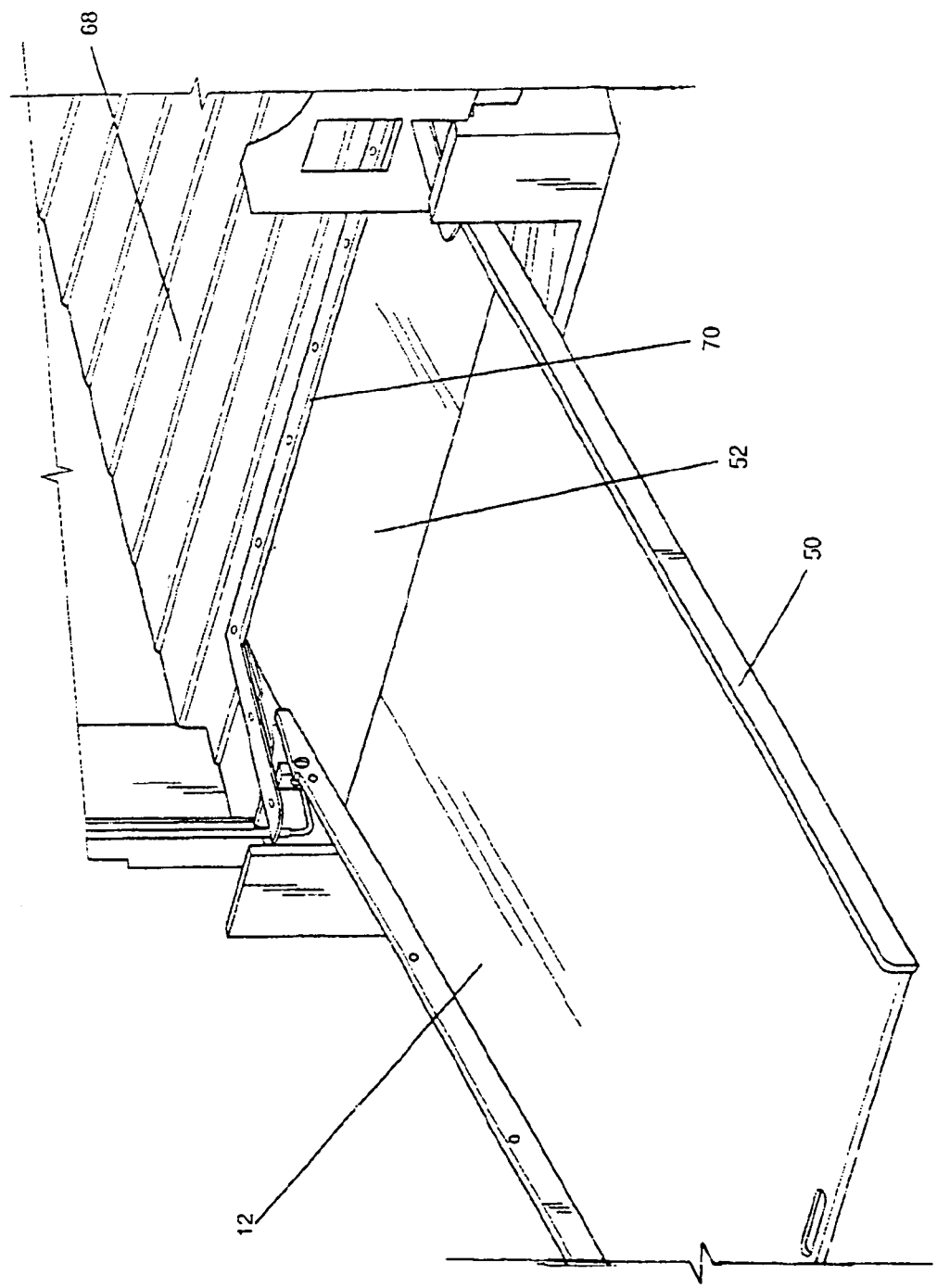
FIG. 4*a* is a perspective view of a mobility vehicle with the retractable ramp system of the present invention in a deployed position.

Turning to FIGS. 4a and 4b, the ramp platform is shown first in the deployed position (FIG. 4a), then in the stowed position (FIG. 4b) as installed in a mobility vehicle having a floor 68. Ramp platform 12 is supported on the underside of the platform by a plurality of radial bearings that are connected to the ramp platform enclosure. The enclosure is directly beneath the floor skins of the mobility vehicle, but within the framerails of the vehicle. Trackpans beneath the ramp enclosure provide a surface against which the lower door arm of the mobility vehicle can travel.

When ramp platform 12 starts to retract into the vehicle for stowage, wedge-shaped brackets 60 connected to ramp flap 52 ride against wear plates 66 (see FIG. 3a) and push flap 52 upward into a horizontal position. Wear plates 66 are connected to ramp platform 12 with fastening means, such as but not limited to screws. Wear plates 66 are provided to reduce wear of ramp platform 12 and comprise a sufficiently durable material such as but not limited to stainless steel. Wheels 54 on flap 52 then ride on ramp platform 12 until the ramp reaches the fully stowed position. Once stowed, wheels 54 act to support ramp flap 52 in the horizontal position thus creating a stable area to step on or for a wheelchair to roll over. This increases flexibility of movement of the wheelchair to the interior the vehicle. Also, an ambulatory person can step on ramp flap 52 when the ramp is stowed to get into or out of the vehicle. This can be done without damage to ramp flap 52 due to the support provided by wheels 54.

Because wheels 54 provide space between ramp flap 52 and ramp platform 12, ramp flap 52 is positioned level with the floor of the mobility vehicle with ramp platform 12 a significant distance below floor level. This configuration allows ramp platform 12 to incorporate taller side lips 50, being approximately equal in height to that of the ramp flap wheels 54, thereby lessening the chance of a wheelchair rolling off the side of ramp platform 12 while entering or exiting the vehicle. The height of side lips 50 is dependent upon the amount of headroom or ground clearance. Side lips 50 can be, but are not limited to, approximately one inch in height to accommodate adequate headroom and ground clearance.

Returning momentarily to FIG. 3a, ramp flap 52 is attached to hinge 62 that is in turn attached to the floor 68 of the vehicle. Ramp flap 52 is preferably attached to hinge 62 through a plurality of rivets in hinge 62. Hinge 62 is preferably welded to the vehicle floor 68 or attached in similar permanent fashion. Hinge 62 allows flap 52 to rotate through its range of motion.

This ramp flap assembly provides a gentle transition from ramp platform 12 to the floor 68 of the vehicle and eliminates the need to rotate ramp platform 12 all the way up to the vehicle floor level. This also eliminates the need for an additional actuator, thereby reducing the cost of the system. Returning to FIGS. 4a and 4b, optional ramp flap trim piece 70 provides physical and visual continuity between ramp flap 52 and the vehicle floor 68 when the ramp system is stowed.

Figure 5A:
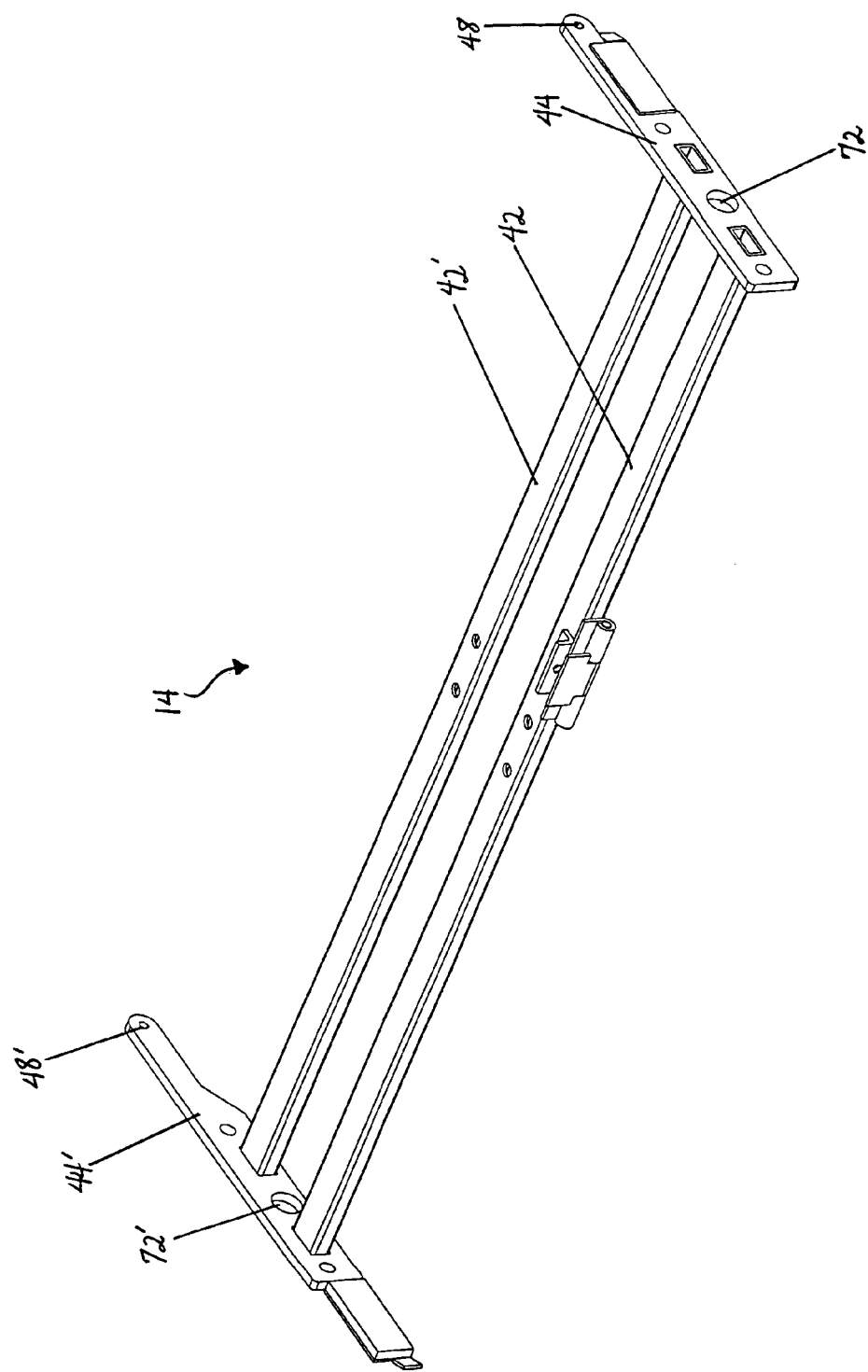
FIG. 5*a* is a perspective view of the carriage assembly of the present invention without the torsion bar.

Retraction and deployment of ramp platform 12 between the stowed and deployed positions is accomplished by carriage assembly 14. This assembly is rigid yet lightweight and acts as the transitional member between linear bearing blocks 30 and ramp platform 12. Referring to FIG. 5a, a perspective view of carriage assembly 14 without torsion bar 58, bearing blocks 30 or guide shafts 32, is shown for ease of viewing rectangular members 42 and pivot arms 44. Rectangular members 42, 42' extend between and are affixed into openings defined in pivot arms 44, 44' for secure attachment, such as by welding. Preferably, rectangular members 42, 42' and pivot arms 44, 44' are made of steel for strength, however, other materials and dimensions for these members would function in accordance with the principles of the invention.

Referring to FIG. 5b, a perspective, exploded view of carriage assembly 14 with torsion bar 58 in place and bearing blocks 30 and guide shafts 32 exploded is shown. Pivot arms 44, 44' attach to bearing blocks 30, 30' respectively with attachment means, such as shoulder bolts 74 and associated nuts through mating openings, or rivets, although it will be understood by those of skill in the art that other means of attachment could serve the identical function. An opening at ramp pivot connection 48 of each pivot arm 44 mates with an opening in each lip 50 of ramp platform 12 for the passage of a pivot bolt (see FIG. 2) to secure platform 12 while allowing it to pivot.

Torsion bar 58 is connected in parallel between rectangular members 42, 42' with opposing ends rotationally fixed into ramp pivot arms 44, 44'. Torsion bar 58 extends through yet freely rotates in openings 72, 72' defined in pivot arms 44, 44' respectively. (See FIG. 5a.) Torsion bar 58, preferably a solid cylindrical rod, is spring-loaded by torsion springs 78, 78'. The function of this assembly can be compared to the manner in which garage doors lessen the force required to raise the door with a torsion spring and cable setup.

The torsion bar assembly reduces the force required to stow the ramp. Springs 78 preload torsion bar 58 that in turn pushes down on ramp platform 12. This reduces the torque required to rotate ramp platform 12 to a horizontal position. By reducing the torque required to rotate ramp platform 12, the force required to translate carriage assembly 14 is also reduced. This reduces the power required from the drive motor as well as the strength required of the drive belt and motor.

Torsion bar 58, springs 78, 78', and flapper bars 76, 76' enable ramp platform 12 to pivot in a smooth and controlled manner. Flapper bars 76, 76' preload ramp platform 12 to mitigate the effect of gravity on the rotational movement of ramp platform 12. Flapper bars 76, 76' attach by connectors 80 to torsion bar 58 at opposing ends and rotate in conjunction with torsion bar 58. Flapper bars 76, 76' press down on the near end of ramp platform 12. This point is on the other side of a fulcrum supporting the weight of the ramp platform center of gravity.

Torsion bar 58 rotates within pivot arms 44, 44'. Torsion springs 78, 78' are held in place by collars 82 on torsion bar 58 and rotate in conjunction with torsion bar 58. (See also FIG. 2.) One end of spring 78 is attached to a bar joining collars 82, 82' together, while the opposing end rests against rectangular member 42. Two or more torsion springs are provided at each spring location 78, 78' as relatively small springs are used so as to fit within the ramp profile, and more than one may be required to provide adequate torsional force. Springs 78, 78' travel with ramp platform 12 throughout the rotational motion of the platform counteracting the weight of the platform resulting in a lighter force required by the motor to retract the ramp. The torsion bar and spring configuration retains the desired low profile of the ramp system for maximum headroom inside the vehicle and maximum ground clearance between the vehicle and road surface. Carriage height adjustment roller 84 is used to adjust the height of carriage assembly 14 as it travels along the ramp enclosure beneath the mobility vehicle during deployment and stowage of the ramp.

Figure 6B:
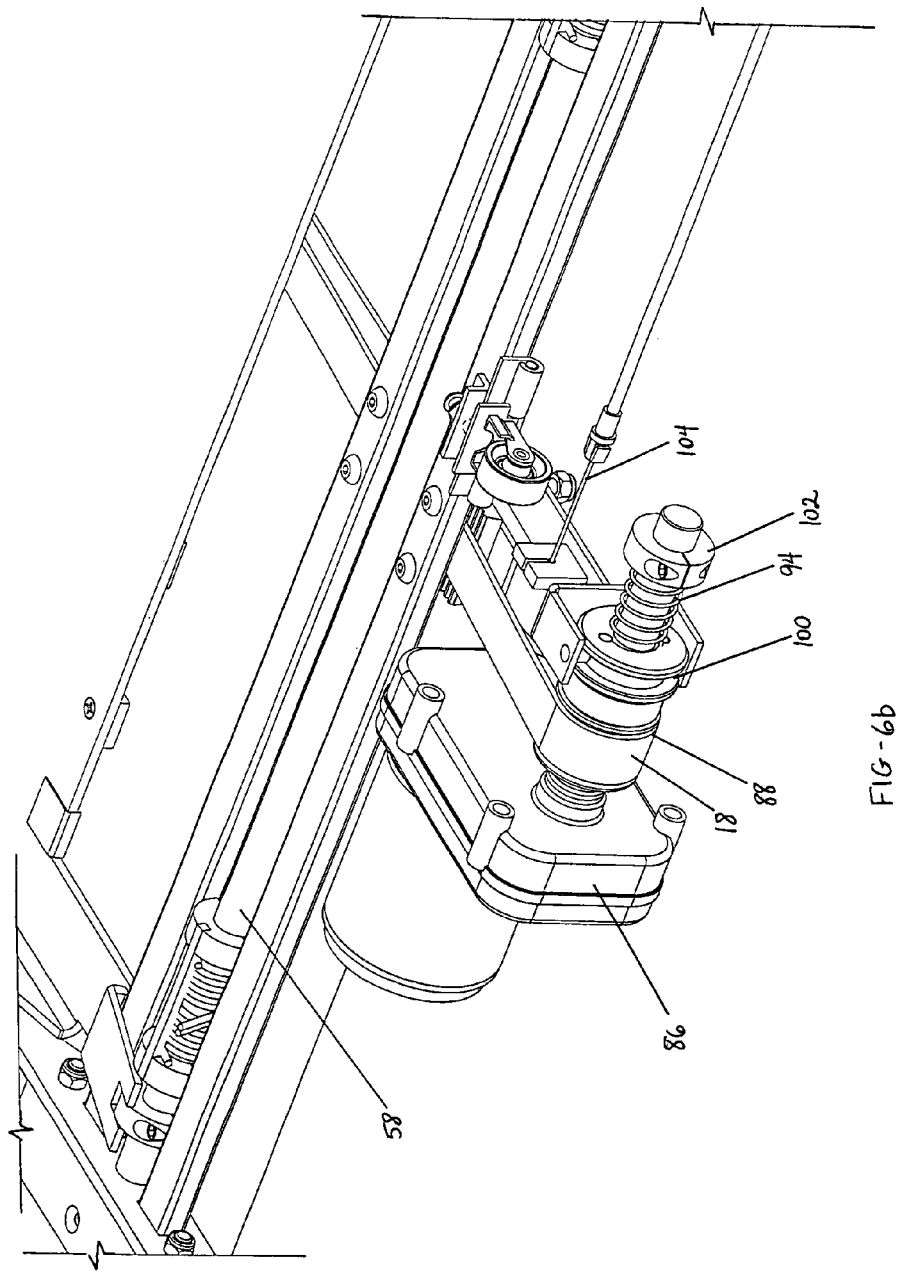
FIG. 6*b* is a perspective view of the motor and manual release assembly of the present invention with the motor engaged.

Attention is now directed to FIGS. 6a and 6b which show perspective views of the motor and release assembly 16 used for retraction and deployment of the ramp system. Reversible electric motor 86 provides power to the system for deploying and retracting the ramp. FIG. 6a shows motor 86 disengaged from the carriage assembly via mechanical motor release assembly 98, which allows the ramp to be deployed manually if power is lost. FIG. 6b shows motor 86 engaged for powering the carriage assembly. These figures are referenced in combination with FIG. 7, which shows an exploded perspective view of the manual release assembly and motor.

Motor 86 is preferably bolted to a plate that is welded to the floor structure of the vehicle. Motor 86 includes drive pulley 88 attached to motor shaft 114 via release assembly 98. One or more spacers 108 space the motor 86 from drive pulley 88. Drive pulley 88 slides over and freely rotates about motor drive shaft 114, except when engaged by dowel pins 96 from sliding collar 100 of release assembly 98 as described further below. Toothed drive belt 18 (not shown) positioned in the center of the ramp connects to carriage assembly 14 and to motor 86 via drive pulley 88 to translate the carriage and associated ramp platform 12 between the stowed and deployed positions. Preferably, drive belt 18 is made of polyurethane with an embedded steel tension cable, although other materials and configurations will serve the function of drive belt 18 in accordance with the invention. Drive belt 18 is attached to carriage assembly 14 via machined blocks that are bolted through rectangular members 42, 42'.

A plurality of openings 110, preferably four, are defined through drive pulley 88 at equidistant points outward from the rotational axis of drive pulley 88. (See FIG. 7.) Two of the four openings 110 accept pins 96, 96' from pinned collar 100 through keyed collar 92 to affix drive pulley 88 to motor 86. There are preferably four openings 110, instead of two, to reduce the rotation required before pins 96 engage drive pulley 88.

Drive shaft 114 of motor 86 has a woodruff key slot 112 cut into the shaft. Keyed collar 92 attaches to shaft 114 via a woodruff key and rotates at the same rotation as the shaft. Keyed collar 92 also includes a setscrew 180 degrees opposite the woodruff key to ensure solid contact with shaft 114.

Release assembly 98 operates via cable 104, drive pulley 88, keyed collar 92 that is mounted upon shaft 114, sliding collar 100 with pins 96 to engage keyed collar 92 with drive pulley 88, stop collar 102 and compression spring 94 to preload the sliding collar mechanism thus allowing the sliding collar mechanism to be disengaged via cable 104.

Figure 7:
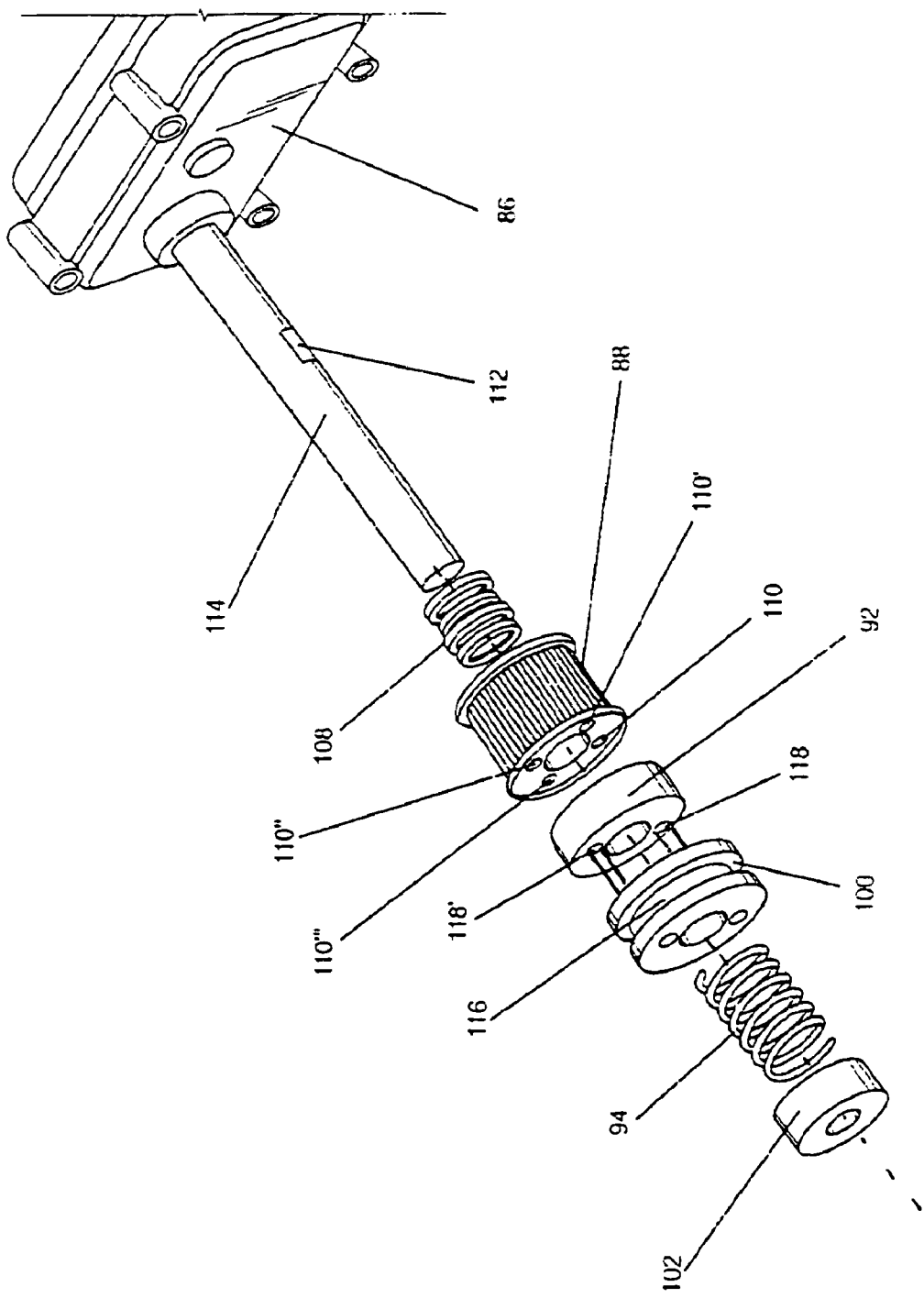
FIG. 7 is an exploded view of the motor and manual release assembly of FIGS. 6*a* and 6*b*.
Figure 8A:
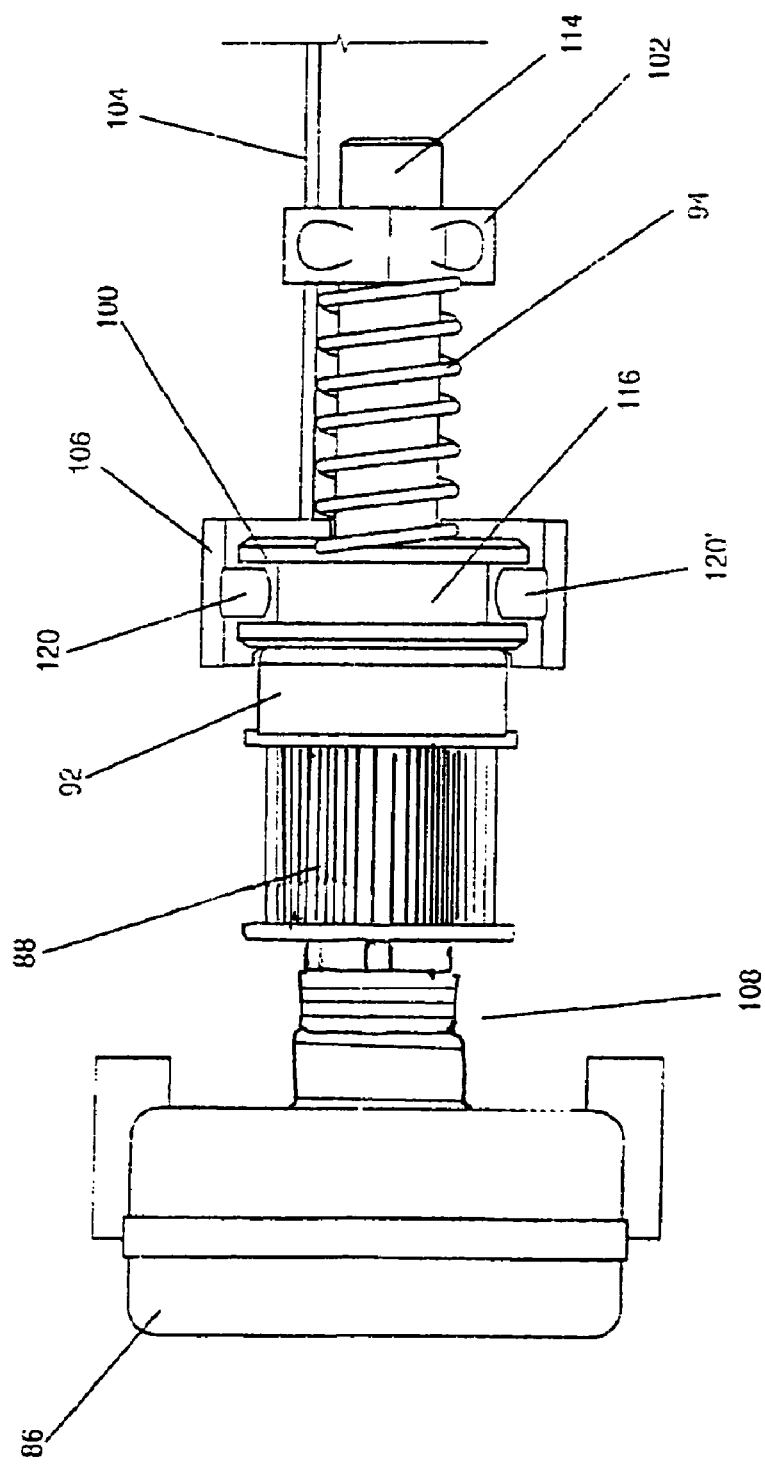
FIG. 8*a* is a side view of the motor in the engaged position for motorized control of the ramp system.
Figure 8B:
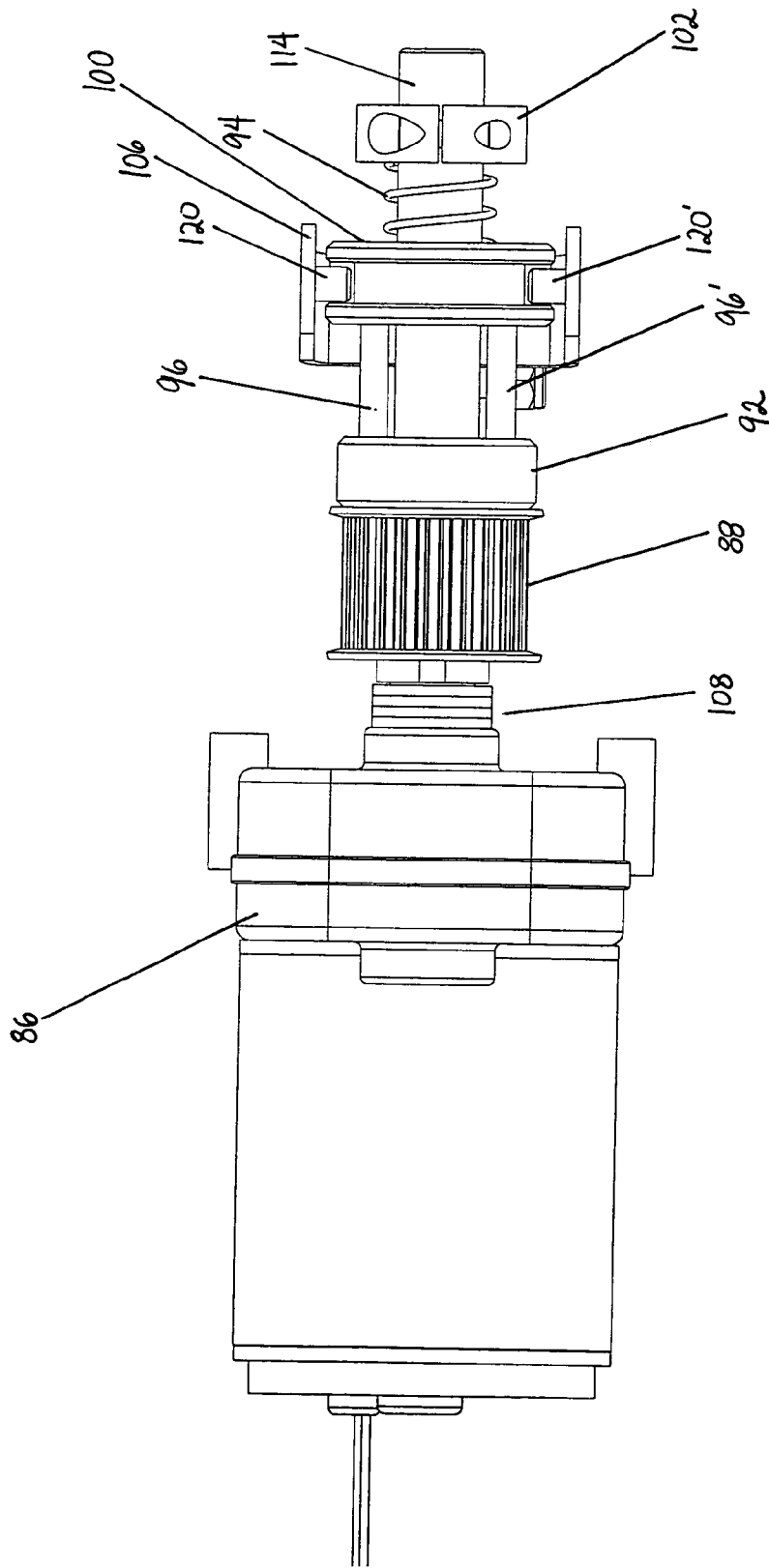
FIG. 8*b* is a side view of the motor assembly in the disengaged position for manual control of the ramp system.

With continuing reference to FIGS. 6a, 6b and 7, attention is additionally directed to FIGS. 8a and 8b. FIG. 8a is a side view of the motor and manual release assembly shown with pins 96 engaged with drive pulley 88, while FIG. 8b is a side view of the motor and manual release assembly shown with pins 96 disengaged from drive pulley 88. Sliding pinned collar 100 is a cylindrical collar with two dowel pins 96 affixed into the collar that extend orthogonally outward from the collar. Collar 100 slides freely back and forth along motor shaft 114. Collar 100 has a groove 116 around its circumference into which two pins 120 of release actuator 106 engage to translate collar 100 along shaft 114. (See FIGS. 6a, 8a and 8b.) When collar 100 translates along shaft 114, pins 96 also translate with collar 100 and slide freely through mating openings 118 in keyed collar 92. (See FIG. 7.) Pins 96 remain contained within keyed collar 92 throughout their translational range.

Release actuator 106 is controlled by release cable 104. (See FIGS. 6a and 6b.) Release actuator 106 is made up of a planar component that is pivotably fixed at a first end, such as by bolt 122, to the ramp enclosure, and which is connected to a C-shaped component at the opposite end. The C-shaped component of release actuator 106 holds pins 120 which engage groove 116 of collar 100. Release actuator 106 is pivotable in a horizontal plane about bolt 122 approximately ten degrees from the longitudinal line along the midpoint of the release actuator. Pivoting occurs from the force exerted by release cable 104 and effects the translation of collar 100 along motor shaft 114. Release cable 104 is shown affixed at an end to release actuator 106 by threading through slit 124 in an upright cable attachment component 126 of release actuator 106. However, release cable 104 is alternatively fixed to release actuator 106 by other means such as by wrapping around an extended component such as a bolt and secured by an associated nut.

When release actuator 106 pivots due to the force from release cable 104, pins 120 of the release actuator cause translational movement of collar 100. (See FIGS. 8a and 8b.) This in turn translates pins 96 of collar 100 so that they are no longer inserted into drive pulley 88. This allows drive pulley 88 to freely rotate about motor shaft 114 thus disconnecting drive belt 18 (FIGS. 6a, 6b) and ramp carriage assembly 14 from motor 86. With drive pulley 88 disengaged, ramp platform 12 slides freely between the stowed and deployed positions.

Release cable 104 extends from the driver's side of the mobility vehicle to the passenger's side where it attaches to a release lever that is accessible from inside the vehicle, or other convenient location, at the opposite end from release actuator 106. Rotation of the release lever pulls on cable 104 thereby disengaging drive pulley 88. Drive pulley 88 is automatically reengaged once the release lever is returned to the original engaged position, which releases tension on release cable 104. This occurs because sliding pinned collar 100 is preloaded by compression spring 94 as shown in FIGS. 8a and 8b. Stop collar 102 located at the distal end of motor shaft 114 from motor 86 is affixed to shaft 114 and serves as a stop for compression spring 94. Compression spring 94 pushes sliding pinned collar 100 toward motor 86 and drive pulley 88 which reengages automatically once openings 110 in drive pulley 88 (see FIG. 7) align with dowel pins 96. Openings 110 align immediately with pins 96 after motor 86 begins rotating again under power, or if a person manually translates ramp 12 a short distance.

Figure 9:
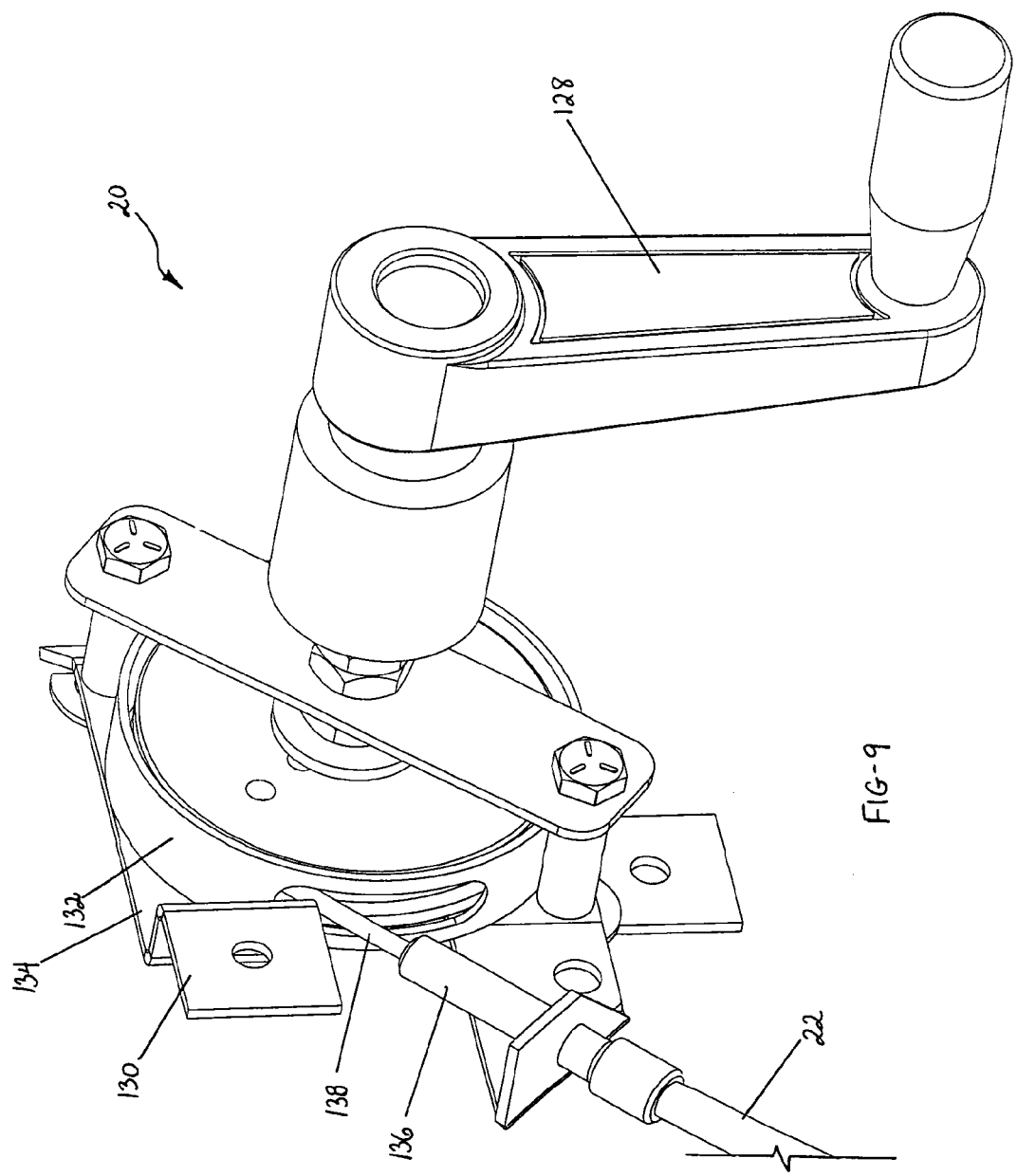
FIG. 9 is a perspective view of the manual control crank assembly of the present invention.
Figure 10:
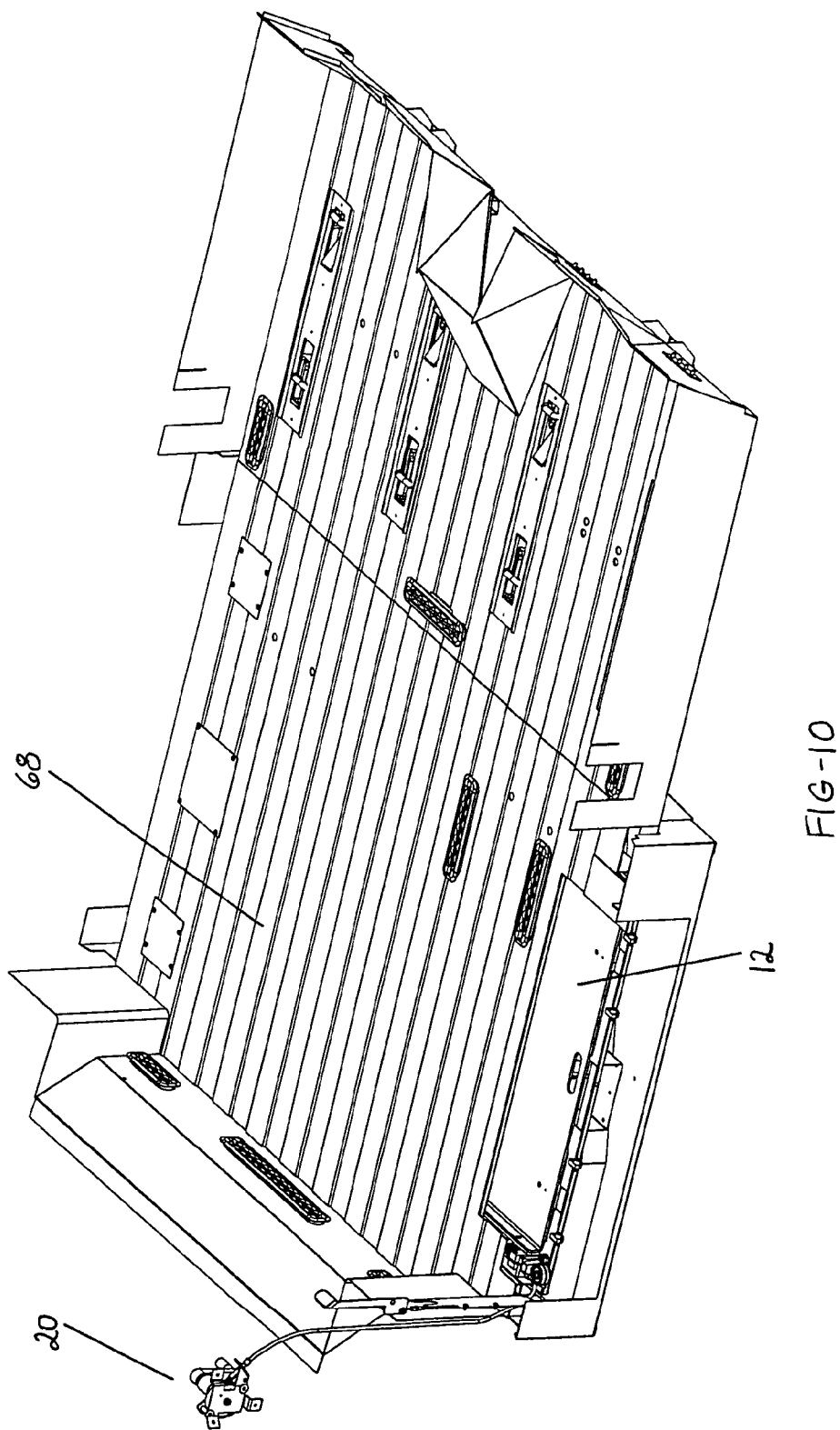
FIG. 10 is a perspective view of a mobility vehicle incorporating the retractable ramp system of the present invention.

In addition to release cable 104 and release actuator 106, manual control crank assembly 20 provides the ability to drive the ramp manually with manual control cable 138 when the ramp is disengaged from motor 86 via release cable 104. Referring to FIG. 9, a perspective view of crank assembly 20 is shown. FIG. 10 shows a perspective view of the floor 68 of a mobility vehicle incorporating the ramp of the present invention and crank assembly 20. Crank assembly 20 is attached to the vehicle via attachment plate 130. For example, crank assembly 20 is attachable behind a C-post panel within the mobility vehicle. Rotatable crank handle 128 is connected to take-up pulley 132 mounted upon pulley support plate 134. Manual control cable 138 is encased in a protective sheath 22 that extends from manual control pulley 132 to rear standoff 34' on the passenger side of the ramp. (See also FIGS. 1 and 10.) Cable 138 continues laterally across to the driver's side of the mobility vehicle where it is attached to manual control bearing block 40. (See FIG. 1a.)

Returning to FIG. 9 showing crank assembly 20, manual control cable 138 extends through cable collar 136 and onto take-up pulley 132. Rotation of crank handle 128 turns take-up pulley 132, which in turn takes up cable 138. Winding cable 138 onto pulley 132 pulls manual control bearing block 40 thereby deploying ramp 12 from the mobility vehicle. Little effort is required to manually control the ramp with crank assembly 20 because drive pulley 88 is disengaged from motor 86.

Crank handle 128 preferably comprises a commercially available handle having a female-threaded insert. A cylindrical shaft is inserted into the insert of handle 128. The opposite end of the cylindrical shaft accepts a pressed-in one-way needle bearing. The one-way needle bearing allows crank handle 128 to grasp a cylindrical shaft and turn the shaft in only one direction. The bearing freely rotates and does not grasp the cylindrical shaft if turned in the opposite direction. The one-way bearing also allows crank handle 128 to be easily installed and removed by simply pressing it onto the shaft or pulling it off of the shaft in like manner. The one-way bearing prevents pulley 132 from turning in the opposite direction and thus possibly binding cable 138. The cylindrical shaft is threaded at the end opposite crank handle 128 to a bolt attached to pulley 132.

Manual control bearing block 40 (FIG. 1a) preferably comprises a machined plastic block containing a linear bearing such as those of linear bearing blocks 30 of carriage assembly 14. The linear bearing translates along guide shaft 32' in like manner to bearing block 30'. Manual control block 40 pushes against bearing block 30' which causes displacement of the ramp to its deployed position. Manual control block 40 is not attached to ramp carriage assembly 14. Therefore, manual control block 40 remains at rest when the ramp is operated under power. Manual control block 40 only translates along guide shaft 32' when crank handle 128 turns pulley 132.

Manual stowage of ramp platform 12 is accomplished by manually lifting the distal end of the platform and pushing it into the stowed position in the vehicle. Ramp platform 12 can alternatively be stowed via motor 86.

With combined reference to FIGS. 1, 2, 3, 4a, 4b, 5a, 5b, 6a and 6b, the method for deployment and stowage of the ramp system is now described. To operate the retractable ramp system 10, a start motor signal is sent to motor 86 to provide power to motor 86 and begin motor operation. Any variety of switch mechanisms can be used in accordance with the ramp system to begin motor operation. For example, a three-position switch can be employed, which provides off, deploy, and stow positions. By placing the switch in the deploy position, motor 86 provides rotation of motor shaft 114 in a first rotational motion causing deployment of the ramp, and by placing the switch in the stow position, motor 86 provides rotation of motor shaft 114 in an opposite rotational motion thereby stowing the ramp. Another example of a switch mechanism includes a momentary control switch, which reverses motor operation direction each time it is triggered. A computer control module can be used to sense the switch input and operate the motor until one of the limit switches is triggered.

To deploy the ramp, rotation of motor shaft 114 rotates drive pulley 88, which transfers the rotational movement to translational movement of drive belt 18 thereby driving carriage assembly 14 which deploys ramp platform 12. Once ramp platform 12 extends such that the ramp platform pivot point 48 (FIGS. 2, 5a and 5b) is past the centerline of wheels 54 (FIGS. 3a and 3b), ramp platform 12 pivots on the supporting bearings. Wheels 54 then drop down into cutout 56 in ramp platform 12. This allows the distal end of ramp flap 52 to sit flush with ramp platform 12 when fully deployed. Upon full deployment, carriage assembly 14 activates adjustable ramp deployed limit switch 26 that shuts off power to electric motor 86. (FIGS. 1, 2, and 3.)

To stow the ramp, rotation of motor shaft 114 rotates drive pulley 88 in an opposite direction from deployment. Drive pulley 88 transfers the rotational movement to translational movement of drive belt 18 thereby driving carriage assembly 14 which takes ramp platform 12 to the stowed position.

When ramp platform 12 begins to be retracted for stowage, wedge-shaped brackets 60 on ramp flap 52 ride against wear plates 66 (see FIG. 3a) that push flap 52 upward into a horizontal position. Flap 52 rotates via hinge 62. The pivot bearings are positioned such that ramp platform 12 pivots to a horizontal position once the motor begins to rotate. Wheels 54 on flap 52 then ride on ramp platform 12 until the ramp reaches the fully stowed position. Once ramp platform is fully stowed, carriage assembly 14 activates adjustable ramp stowed limit switch 28 that shuts off power to electric motor 86. (FIG. 1a.)

Although the ramp system 10 has been described with application to a mobility vehicle, such as a lowered-floor minivan, the ramp system is also adaptable for placement in other transportation vehicles. For example, ramp system 10 can be installed in a bus or train. Additionally, ramp system 10 can be installed in a house or other building.

Although the invention has been described in detail with reference to this preferred embodiment, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A retractable ramp system comprising:
   a frame including longitudinal guide members;
   a carriage extending laterally between and longitudinally moveable along the guide members;
   a ramp pivotably coupled to the carriage and movable between stowed and deployed positions;
   a motor coupled to the frame, the motor including a drive shaft defining an axis;
   a drive assembly coupled to the motor and including a drive pulley defining a plurality of axially-extending openings, a drive member driven by the drive pulley and coupled to the carriage, and a release assembly for engaging and disengaging the drive pulley and the motor, the release assembly including a first collar axially slidable along the drive shaft and including a pair of axially-extending pins, the pins selectively received by at least some of the plurality of openings in the drive pulley to rotatably couple the drive pulley to the drive shaft, the release assembly also including a second collar coupled to the drive shaft for rotation therewith between the first collar and the drive pulley, the second collar defining openings through which the pins extend, the motor operable to move the ramp between the stowed and deployed positions when engaged with the drive pulley; and
   a manual control assembly including a bearing block moveable under manual control along one of the guide members to deploy the ramp when the motor and the drive pulley are disengaged, wherein the drive pulley freely rotates upon the drive shaft when the release assembly disengages the drive pulley from the motor.

2. The retractable ramp system of claim 1, wherein the carriage includes bearing members movable along the guide members, and wherein the bearing block engages one of the bearing members to urge the carriage along the guide members during manual movement of the ramp toward the deployed position.

3. The retractable ramp system of claim 1, wherein the manual control assembly includes a manual crank assembly including a handle, a pulley, and a cable coupled to the pulley and the bearing block, and wherein rotation of the handle winds the cable upon the pulley to pull the bearing block along the one of the guide members to deploy the ramp.

4. The retractable ramp system of claim 1, the release assembly further including:
   a stop collar coupled to an end of the drive shaft;
   a biasing member positioned between the stop collar and the second collar and biasing the second collar toward the drive pulley to thereby bias the pins into engagement with the at least some of the plurality of openings in the drive pulley.

5. The retractable ramp system of claim 4, wherein the first collar defines a groove, the release assembly further including:
   a release actuator including at least one pin received by the groove; and
   a release cable coupled to the release actuator and manually operable to overcome the biasing member and move the release actuator pin and, thereby, the first collar, axially away from the drive pulley to disengage the drive pulley from the drive shaft.

6. The retractable ramp system of claim 1, wherein the bearing block remains substantially stationary relative to the guide member during movement of the ramp toward the deployed position by the motor when the motor is engaged with the drive pulley.

7. A retractable ramp system for a vehicle having a floor, the retractable ramp system comprising:
   a frame including longitudinal guide members;
   a carriage extending laterally between and longitudinally moveable along the guide members;
   a motor operable to move the carriage along the guide members;
   a ramp pivotally coupled to the ramp carriage for movement therewith between stowed and deployed positions, the ramp including a substantially planar support surface and lips extending substantially orthogonally to the support surface and longitudinally along outer edges of the ramp, the support surface defining a cutout along an inboard end of the ramp; and
   a ramp flap having an inboard end pivotally coupled adjacent to the floor and an outboard end, the outboard end including a plurality of rollers that ride along the support surface during movement of the ramp platform between the stowed and deployed position, and that fall off of the support surface and drop into the cutout when the ramp platform reaches the deployed position, wherein the ramp flap provides a transition surface for movement between the support surface and the vehicle floor, wherein the plurality of rollers includes a pair of outboard rollers and at least one inboard roller, wherein at least some of the rollers are coupled to the ramp flap by a substantially wedge-shaped bracket, and wherein during movement of the ramp platform from the deployed position toward the stowed position, the wedge-shaped brackets engage the ramp platform to urge the ramp flap upwardly and position the rollers for engagement with the support surface.

8. The retractable ramp system of claim 7, wherein the ramp platform includes a pair of wear plates disposed on the support surface for engagement with the wedge-shaped brackets during movement of the ramp platform from the deployed position toward the stowed position.

* * * * *